United States Patent [19]

Shustorovich et al.

[11] Patent Number: 5,542,006
[45] Date of Patent: Jul. 30, 1996

[54] NEURAL NETWORK BASED CHARACTER POSITION DETECTOR FOR USE IN OPTICAL CHARACTER RECOGNITION

[75] Inventors: Alexander Shustorovich; Christopher W. Thrasher, both of Rochester, N.Y.

[73] Assignee: Eastman Kodak Company, Rochester, N.Y.

[21] Appl. No.: 263,304

[22] Filed: Jun. 21, 1994

[51] Int. Cl.$^6$ ............................................. G06K 9/62
[52] U.S. Cl. ..................... 382/156; 387/159; 387/173; 395/21
[58] Field of Search ................... 395/20, 21, 22, 395/23, 24; 382/155, 156, 161, 157, 158, 159, 186, 187, 173

[56] References Cited

U.S. PATENT DOCUMENTS

| | | | |
|---|---|---|---|
| 4,933,977 | 6/1990 | Ohnishi et al. | 382/9 |
| 5,052,043 | 9/1991 | Gaborski | 382/14 |
| 5,105,468 | 4/1992 | Guyon et al. | 382/14 |
| 5,119,438 | 6/1992 | Ueda et al. | 382/14 |
| 5,131,073 | 7/1992 | Furuta et al. | 395/27 |
| 5,151,951 | 9/1992 | Ueda et al. | 382/19 |
| 5,239,593 | 8/1993 | Wittner et al. | 382/14 |
| 5,245,672 | 9/1993 | Wilson et al. | 382/9 |
| 5,299,269 | 3/1994 | Gaborski et al. | 382/9 |
| 5,440,651 | 8/1995 | Martin | 382/156 |

OTHER PUBLICATIONS

A. Shustorovich, "A Subspace Projection Approach to Feature Extraction: The Two–Dimensional Gabor Transform for Character Recognition" to appear in *Neural Networks*, 1994, vol. 7, No. 5.

Y. Bengio et al., "Globally Trained Handwritten Word Recognizer using Spatial Representation, Convolutional Neural Networks. and Hidden Markov Models", Proceedings of 1993 Conference on Neural Information Processing Systems—Natural and Synthetic, Nov. 29–Dec. 2, 1993, Denver, Colorado, pp. 937–944.

A. Gupta et al., "An Integrated Architecture for Recognition of Totally Unconstrained Handwritten Numerals", *International Journal of Pattern Recognition and Artificial Intelligence*, 1993, vol. 7, No. 4, pp. 757–773.

G. Martin et al., "Learning to See Where and What: Training a Net to Make Saccades and Recognize Handwritten Characters" (1993), appears in S. J. Hanson et al. (eds.), *Advances in Neural Information Processing Systems*, vo 1. 5, pp. 441–447 (Morgan Kaufmann Publishers, San Mateo, CA).

(List continued on next page.)

Primary Examiner—Joseph Mancuso
Attorney, Agent, or Firm—Dennis R. Arndt

[57] ABSTRACT

Apparatus, and an accompanying method, for use in an optical character recognition (OCR) system (5) for locating, e.g., center positions ("hearts") of all desired characters within a field (310; 510) of characters such that the desired characters can be subsequently recognized using an appropriate classification process. Specifically, a window (520) is slid in a step-wise convolutional-like fashion ($520_1$, $520_2$, $520_3$) across a field of preprocessed, specifically uniformly scaled, characters. Each pixel in the window is applied as an input to a positioning neural network (152) that has been trained to produce an output activation whenever a character "heart" is spatially coincident with a pixel position within an array (430) centrally located within the window. As the window is successively moved across the field, in a stepped fashion, the activation outputs of the neural network are averaged, on a weighted basis, for each different window position and separately for each horizontal pixel position in the field. The resulting averaged activation output values, typically in the form of a Gaussian distribution for each character, are then filtered, thresholded and then used, via a weighted average calculation with horizontal pixel positions being used as the weights, to determine the character "heart" position as being the center pixel position in the distribution.

23 Claims, 16 Drawing Sheets

OTHER PUBLICATIONS

J. Keeler et al., "A Self-Organizing Integrated Segmentation and Recognition Neural Net", appears in J. E. Moody et al. (eds.), *Advances in Neural Information Processing Systems*, 1992, vol. 4, pp. 496–503.

J. A. Freeman et al., *Neural Networks—Algorithms, Applications and Programming Techniques*, pp. 89–125 (copyright 1991: Addison–Welsey Publishing Company, Inc.).

J. Daugman, "Complete Discrete 2–D Gabor Transforms by Neural Networks for Image Analysis and Compression", *IEEE Transactions on Acoustics, Speech and Signal Processing*, 1988, vol. 36, No. 7, pp. 1169–1179.

D. E. Rumelhart et al., *Parallel Distributed Processing*, vol. 1, pp. 328–330 (copyright 1988, MIT Press).

Original Image Field
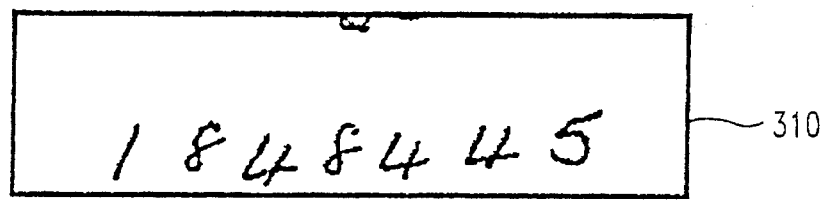
310
Detected Sub-Images
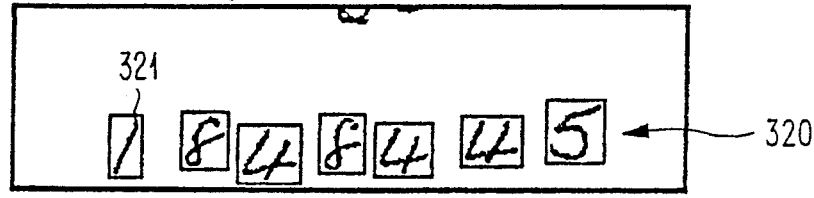
321
320
Scaled Sub-Images
335
330
FIG. 3A
Character Heart Index Waveform
340
Detected Character Hearts
356
351
350
Character Heart Images
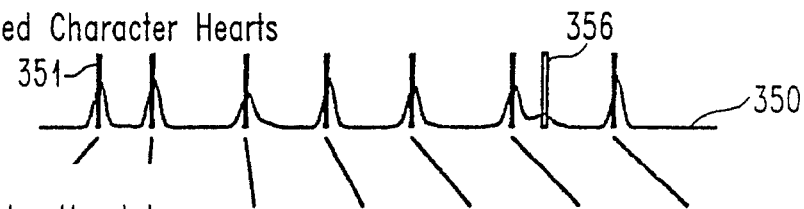
360
361
Character Labels
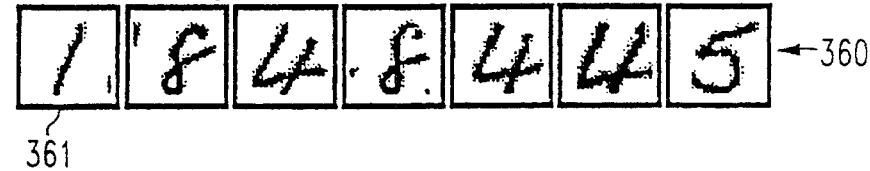
370

Original Image

Detected Sub-Images

Scaled Sub-Images

Character Heart Index Waveform

Detected Character Hearts

Character Heart Images

Character Labels 2  7

Original Image 0 0 5 3 2 0 1

Detected Sub-Images 0 0.5 3 2 0 1

Scaled Sub-Images 0 0 5 3 2 0 1

Character Heart Index Waveform

Detected Character Hearts

Character Heart Images

| 0 | 0 | 5 | 3 | 2 | 0 | 1 |

Character Labels 0   0   5   3   2   0   1

Original Image

Detected Sub-Images

Scaled Sub-Images

Character Heart Index Waveform

Detected Character Hearts

Character Heart Images

Character Labels 1 1 9 3 5 0

FIG. 11 POSITIONING ERROR DISTRIBUTIONS
| | False Alarm | Misses | Positioning Error Distribution (%) | | | | | | | | |
|---|---|---|---|---|---|---|---|---|---|---|---|
| | | | -4 | -3 | -2 | -1 | 0 | 1 | 2 | 3 | 4 |
| Saccade | 0.5 | 1.0 | 1.3 | 4.7 | 15.3 | 32.4 | 30.0 | 12.2 | 2.2 | 0.7 | 0.2 |
| SYSTEM 5 | 0.0 | 0.2 | 0.3 | 1.1 | 6.8 | 33.0 | 39.9 | 15.5 | 2.3 | 0.7 | 0.2 |
1110 (table), 1120 (graph)
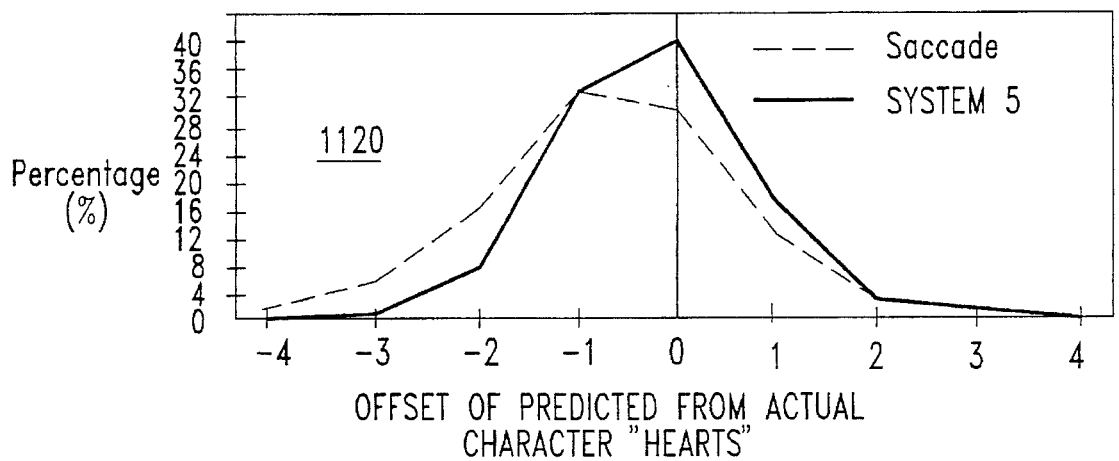
OFFSET OF PREDICTED FROM ACTUAL CHARACTER "HEARTS"
FIG. 12 CLASSIFICATION ERROR DISTRIBUTIONS
| | Percent Correct | | |
|---|---|---|---|
| Offset | Saccade | SYSTEM 5 | Error Reductions |
| -2 | 91.8% | 96.5% | 57% |
| -1 | 95.7% | 97.5% | 41% |
| 0 | 96.0% | 97.7% | 42% |
| 1 | 95.3% | 97.5% | 46% |
| 2 | 87.6% | 96.7% | 73% |
1210
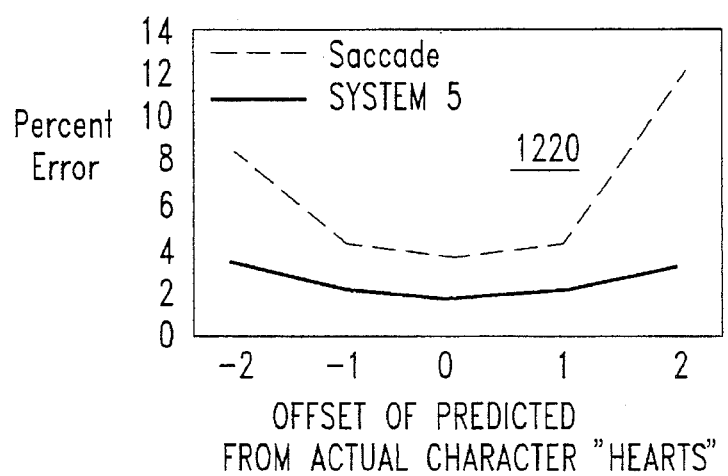
OFFSET OF PREDICTED FROM ACTUAL CHARACTER "HEARTS"

NEURAL NETWORK BASED CHARACTER POSITION DETECTOR FOR USE IN OPTICAL CHARACTER RECOGNITION

TECHNICAL FIELD OF THE INVENTION

The invention relates to apparatus, and an accompanying method, for use in an optical character recognition (OCR) system for locating positions, such as centers, of, e.g., all desired characters within a field of characters, such that the desired characters can be subsequently recognized using an appropriate classification process.

BACKGROUND ART

Through the use of word processors and/or other data processing and computerized office equipment, the number of paper documents, particularly forms, of one kind or another that are currently in use has simply exploded over the past few decades. At some point, the information on most of these documents must be extracted therefrom and processed in some fashion.

For example, one document that is in wide use today is a paper bank check. A payor typically fills in, either by hand or through machine, a dollar amount on an appropriate line of the check and presents the check to its recipient. The recipient deposits the check in its bank. In order for this bank to process the check for payment, a human operator employed by the bank reads the amount on the check and instructs a printer to place appropriate digits on the bottom of the check. These digits and similar electronic routing codes situated on the bottom of the check are subsequently machine read to initiate an electronic funds transfer through a banking clearinghouse from the payor's account at its bank (i.e. the paying bank) to the recipient's account at its bank (the presenting bank) and to physically route the check back through the clearinghouse from the presenting bank to the payor bank for cancellation. Inasmuch as the number of checks has been and continues to substantially increase over the past few years, the cost to banks of processing paper checks has been steadily increasing. In an effort to arrest these cost increases or at least temper their rise, banks continually attempt to bring increasing levels of machine automation to the task of processing checks. Specifically, various individuals in banking believe that if the check encoding process were automated by replacing human operators with appropriate optical character recognition (OCR) systems, then the throughput of encoded checks and encoding accuracy will both substantially increase while significant concomitant cost savings will occur. As envisioned, such systems would scan the writing or printing that appears on each check, accurately translate a scanned dollar amount into digital signals, such as appropriate ASCII words, and, inter alia, operate a printer to print appropriate numeric characters onto the bottom of each check in order to encode it.

With the ever expanding amount of paper documents in use in present day society—of which paper checks represent only one illustrative example, the human resources needed to read these documents and convert their contents into machine readable form or directly into computer data are simply becoming either unavailable or too costly to use. As such, a substantial need exists, across many fields, to develop and use OCR systems to accurately automate the process of recognizing and translating first machine printed alphanumeric characters and ultimately handwritten characters into appropriate digital data.

For various reasons not relevant here, starting several years ago and continuing to the present, neural networks are seen in the art as a preferred technique for providing accurate character recognition in an OCR system.

In contrast to traditional sequential "Von Neumann" digital processors that operate with mathematical precision, neural networks are generally analog—though digital implementations are increasingly common, and typically manifest massively parallel processing. These networks provide fast and often surprisingly good output approximations, but not precise results, by making weighted decisions on the basis of fuzzy, incomplete and/or frequently contradictory input data.

By way of background, a neural network is basically a configuration of identical processing elements, so-called neurons, that are arranged in a multi-layered hierarchical configuration. Each neuron can have one or more inputs, but only one output. Each input is weighted by a coefficient. The output of a neuron is typically calculated as a function of the sum of its weighted inputs and a bias value. This function, the so-called activation function, is typically a "sigmoid" function; i.e. it is S-shaped, monotonically increasing and asymptotically approaches fixed values typically +1, and zero or −1 as its input respectively approaches positive or negative infinity. The sigmoid function and the individual neural weight and bias values determine the response or "excitability" of the neuron to signals presented to its inputs. The output of a neuron in one layer is distributed as input to neurons in a higher layer. A typical neural network contains at least three distinct layers: an input layer situated at the bottom of the network, an output layer situated at the top of the network and one or more hierarchical interconnected hidden layers located intermediate between the input and output layers. For example, if a neural network were to be used for recognizing normalized alphanumeric characters situated within a 7×5 pixel array, then the output of a sensor for each pixel in that array, such as a cell of an appropriate charge coupled device (CCD), is routed as input to a different neuron in the input layer. Thirty-five different neurons, one for each different pixel, would exist in this layer. Each neuron in this layer has only one input. The outputs of all of 35 neurons in the input layer are distributed, in turn, as input to the every neuron in, e.g., a single intermediate or so-called hidden layer. The output of each of the neurons in the hidden layer is distributed as an input to every neuron in the output layer. The number of neurons in the output layer typically equals the number of different characters that the network is to recognize, with the output of each such neuron corresponding to a different one of these characters. The numerical outputs from all the output layer neurons form the output of the network. For example, one output neuron may be associated with the letter "A", another with the letter "B", a third with the letter "a", a fourth with the letter "b" and so on for each different alphanumeric character, including letters, numbers, punctuation marks and/or other desired symbols, if any, that is to be recognized by the network. The number of neurons in this single hidden layer, as well as the number of separate hidden layers that is used in the network, depends, inter alia, upon the complexity of the character bit-maps to be presented to the network for recognition; the desired information capacity of the network; the degree to which the network, once trained, is able to handle unfamiliar patterns; and the number of iterations that the network must undergo during training in order for all the network weight and bias values to properly converge. If the network were to utilize several separate hidden layers, then the output from each neuron in the first (i.e. lowest) hidden layer would feed the inputs to the neurons in the second (i.e. next higher) hidden layer and so forth for the remaining hidden layers. The output of the neurons in the last (i.e. highest) hidden layer would feed the neural inputs in the output layer. The output of the network typically feeds a processor or other circuitry that converts the network output into appropriate multi-bit digital data, e.g. ASCII characters, for subsequent processing.

The use of a neural network generally involves two distinct successive procedures: initialization and training on known pre-defined patterns having known outputs, followed by recognition of actual unknown patterns.

First, to initialize the network, the weights and biases of all the neurons situated therein are set to random values typically within certain fixed bounds. Thereafter, the network is trained. Specifically, the network is successively presented with pre-defined input data patterns, i.e. so-called training patterns. The values of the neural weights and biases in the network are simultaneously adjusted such that the output of the network for each individual training pattern approximately matches a desired corresponding network output (target vector) for that pattern. Once training is complete, all the weights and biases are then fixed at their current values. Thereafter, the network can be used to recognize unknown patterns. During pattern recognition, each unknown pattern is applied to the inputs of the network and resulting corresponding network responses are taken from the output nodes. Ideally speaking, once the network recognizes an unknown input pattern to be a given character on which the network was trained, then the signal produced by a neuron in the output layer and associated with that character should sharply increase relative to the signals produced by all the other neurons in the output layer.

One technique commonly used in the art for adjusting the values of the weights and biases of all the neurons during training is back error propagation (hereinafter referred to simply as "back propagation"). Briefly, this technique involves presenting a pre-defined input training pattern (input vector) to the network and allowing that pattern to be propagated forward through the network in order to produce a corresponding output pattern (output vector, O) at the output neurons. The error associated therewith is determined and then back propagated through the network to apportion this error to individual neurons in the network. Thereafter, the weights and bias for each neuron are adjusted in a direction and by an amount that minimizes the total network error for this input pattern.

Once all the network weights have been adjusted for one training pattern, the next training pattern is presented to the network and the error determination and weight adjusting process iteratively repeats, and so on for each successive training pattern. Typically, once the total network error for each of these patterns reaches a pre-defined limit, these iterations stop and training halts. At this point, all the network weight and bias values are fixed at their then current values. Thereafter, character recognition on unknown input data can occur at a relatively high speed.

During character recognition, a "winner take all" approach is generally used to identify the specific character that has been recognized by the network. Under this approach, once the network has fully reacted to an input data pattern, then the one output neuron that generates the highest output value relative to those produced by the other output neurons is selected, typically by a processing circuit connected to the network, as the network output. Having made this selection, the processor then determines, such as through a simple table look-up operation, the multi-bit digital representation of the specific character identified by the network.

Neural network based OCR systems have exhibited excellent performance characteristics with machine printed text, particularly "clean" text that exhibits a high degree of uniformity, in terms of line thickness and orientation, from one character to the next. Unfortunately, the task of recognizing characters, even through the use of a neural network, is complicated by the existence of touching or otherwise overlapping characters. While a very small number of machine printed characters actually touch, due to kerning and the like, touching and overlapping characters are particularly prevalent with handwritten text and numerals, effectively exhibiting, due to human variability, an infinite number of variations. Clearly, for the sake of efficiency and implementation simplicity, a neural network can not be trained to recognize even a major portion, let alone all, of these variations.

In an effort to greatly simplify the task of recognizing human handwriting, the art teaches the use of determining those characters which touch and then segmenting or otherwise partitioning these characters apart and recognizing each character that results. In this regard, the art teaches two basic approaches: performing segmentation prior to character recognition, or simultaneously performing both segmentation and recognition.

One example of the former pre-recognition segmentation approach is the system disclosed in U. S. Pat. No. 5,299,269 (issued to R. S. Gaborski et al on Mar. 29, 1994 and assigned to the present assignee hereof, also referred to herein as the '269 patent). Here, a sliding window is stepped across an image field, on a pixel-by-pixel basis, to capture a sub-image, i.e. a kernel of the image. An associate memory or neural network is trained, through one training set, to recognize all non-character images that can exist within the sub-image, i.e. all possible intersections and combinations of known characters that correspond to window positions that straddle adjacent characters. This training includes window-captured sub-images that in the past were incorrectly perceived as being centered on a character when in fact they were not, i.e. the result of false character segmentation. The same memory or network, or a second one, is trained, through a second training set, to recognize the individual "non-straddling" characters of a given character set. If one item of the training sets is recognized, then the entire sub-image is forwarded to a downstream portion of an OCR system for further character recognition. For this particular system to properly function, the appropriate memory or network must be trained on all possible non-character images. Unfortunately, a very large, potentially infinite, number of such images can exist. Hence, if a training sequence is to encompass a substantial number, even if considerably much less than all such, non-character images, then the accuracy with which any one of these images will be recognized will be reduced. Furthermore, as the number of different characters which a network (or memory) must recognize increases, the size and complexity of that network (or memory) increases at a considerably greater rate. Hence, the system disclosed in the '269 patent is rather impractical.

Another example of the pre-recognition segmentation approach is described in A. Gupta et al, "An Integrated Architecture for Recognition of Totally Unconstrained Handwritten Numerals" *International Journal of Pattern Recognition and Artificial Intelligence,* 1993, Vol. 7, No. 4, pages 757–773. Here, once an image is scanned, typically to implement machine recognition of a handwritten zip code, a resulting digital binary bit-map of a source document, such as an envelope, is passed through a preprocessing stage which performs segmentation, thinning and rethickening (the latter two functions to impart uniform thickness to otherwise differing stroke thicknesses among different characters) as well as character size normalization and slant correction. Character recognition is then performed on a resulting preprocessed bit-map. By reducing differences among resulting characters, the complexity of the recognition stage, particularly the neural network used therein, would be considerably reduced. However, the prerecognition segmentation approach has exhibited, on an empirical basis, quite some difficulty in accurately separating touching characters.

Consequently, as a result of this difficulty among other reasons, the art is turning to a combined segmentation-recognition approach. This latter approach typically involves moving a window, e.g. a so-called "sliding" window, of a certain width across a field and fabricating confidence measures for competing character classifications to determine if the window is positioned directly on top of character as well as to undertake recognition of that character. A combined segmentation/recognition approach is described, for example, in Martin et al, "Learning to See Where and What: Training a Net to Make Saccades and Recognize Handwritten Characters" (1993), appears in S. J. Hanson et al (eds.), Advances in Neural Information Processing Systems, Volume 5, pages 441–447 (Morgan Kaufmann Publishers, San Mateo, Calif.). Here, a system (which, for convenience, will henceforth be referred to herein as the "Saccade" system) is described in which a four-layer neural network (i.e. with two hidden layers) is trained, using back propagation, not only to locate and recognize characters, by class, in the center of a window (as well as whether a character exists in the window or not) but also to make corrective jumps, i.e. so-called "saccades" to the nearest character, and after its recognition, to the next character and so forth. Unfortunately, this system tends to miss relatively narrow characters and occasionally duplicates relatively wide characters, thereby reducing overall recognition accuracy. Another combined segmentation/recognition approach, is described in Bengio et al, "Globally Trained Handwritten Word Recognizer using Spatial Representation, Convolutional Neural Networks and Hidden Markov Models", *Proceedings of* 1993 *Conference on Neural Information Processing Systems—Natural and Synthetic,* Nov. 29–Dec. 2, 1993, *Denver, Colo., pages* 937–944. This approach relies on using a multi-layer convolution neural network with multiple, spatially replicated, sliding windows displaced by a one or several pixel shift with respect to each other along the scanning direction. The outputs of corresponding neural classifiers serve as input to a post-processing module, specifically a hidden Markov model, to decide which one of the windows is centrally located over a character. This approach provides a neural output indicating whether the character is centered within a window or not. Unfortunately, this particular approach of replicating a neural classifier when viewed with the need for post-processing, tends to be quite expensive computationally, relatively slow and thus impractical.

Therefore, a general and still unsatisfied need exists in the art for an OCR system that is capable of accurately and efficiently recognizing handwritten characters that include touching and/or otherwise overlapping characters.

In furtherance of meeting this general need, we believe that a relatively simple and fast, yet accurate apparatus (and an accompanying method), particularly suited for inclusion within an OCR system is required to properly locate each character (or other object), that is to be recognized, from within a field of such characters. Ideally, to handle a wide variety of different characters, the apparatus should utilize a neural network. By using such apparatus in conjunction with appropriate character recognition, we expect that, by centrally positioning a recognition window over a character, fewer different patterns within the window would need to be classified thereby simplifying the recognition task. Hence, the resulting OCR system would likely recognize handwritten characters more accurately and efficiently than has heretofore occurred with OCR systems known in the art.

DISCLOSURE OF THE INVENTION

We have advantageously invented a neural-network based position detector which accurately determines the center position ("heart") of a character, or group thereof, from among those characters situated within a field of such characters. By exhibiting requisite robustness to touching or otherwise overlapping characters while providing implementational simplicity and efficient operation, our inventive system, when used within an OCR system, advantageously overcomes the deficiencies inherent in the art.

Specifically, in accordance with our inventive teachings, our inventive character "heart" detector relies on sliding a window, illustratively 6-pixels wide by 24-pixels high, in a step-wise convolutional-like fashion across a field of preprocessed, specifically uniformly scaled, characters. Each pixel in the window is applied as an input to a positioning neural network that has been trained to produce an output activation whenever a character center, i.e. "heart", is spatially coincident with a pixel position within an array, illustratively 12-pixels by 24-pixels in size, centrally located within the window. As the window is successively moved across the field, in a stepped fashion, the activation outputs of the neural network are averaged, on a weighted basis, for each different window position and separately for each horizontal (field) pixel position in the field. The resulting averaged activation output values, typically in the form of a Gaussian distribution for each character, are then filtered, thresholded and then used, via a weighted average calculation with horizontal pixel positions being used as the weights, to determine the character "heart" position as being the center pixel position in the distribution.

Once the character "heart" position is determined for a character, thereafter a field portion, typically 24×24 pixels, centered about the character is parsed from the field. This field portion is directed to a classifier, e.g., a second neural network, to recognize the character centered within this portion. Appropriate postprocessing, based on detected character "heart" spacing, character width and a resulting confidence measure with which a character has been recognized, determines whether a recognized character is valid or should be rejected.

By providing an array of outputs from the positioning neural network which collectively locates each character "heart" within a central array portion of a sliding window, our inventive neural network position detector detects character positions with increased accuracy over that heretofore taught in the art. Advantageously, by virtue of providing image portions with accurately centered characters for subsequent recognition, an OCR system that utilizes our invention will likely recognize characters with enhanced accuracy.

BRIEF DESCRIPTION OF THE DRAWINGS

The teachings of the present invention may be readily understood by considering the following detailed description in conjunction with the accompanying drawings, in which:

FIGS. 3A–3F each diagrammatically depicts the sequence of high-level operations performed by system 5, shown in FIG. 1, on a different illustrative input field of characters;

FIG. 11 tabularly and graphically depicts distributions of positioning error that resulted from simulating the performance of our system against that of the "Saccade" system known in the art; and FIG. 12 tabularly and graphically depicts distributions of classification error that resulted from simulating the performance of our system against that of the "Saccade" system.

To facilitate understanding, identical reference numerals have been used, where appropriate, to denote either identical or similar elements that are common to various figures.

MODES OF CARRYING OUT THE INVENTION

After reading the following description, those skilled in the art will readily appreciate that our inventive neural network based position detector, while ideally suited for use in an optical character recognition (OCR) system, can be used in a wide variety of other pattern recognition applications to accurately locate an object within an image, and certainly within a scanned portion of that image. For example, one such illustrative application in so-called "machine vision" might include sliding a scanning window across an image to first coarsely locate or at least determine the existence of certain desired objects, such as pre-defined shapes, within an image or portion thereof. Once such an object is determined to exist, our invention can be used to precisely locate the object within the window. The windowed portion of the image would then be scanned at fine resolution, and subsequently processed, using an appropriate classification process, to recognize and otherwise identify the object at high accuracy. The use of our invention permits the center of an object to be precisely located prior to the onset of classification, and, through doing so, to simplify subsequent recognition and also improve overall recognition accuracy. Since our invention is particularly suited for use within an OCR system to accurately locate characters for subsequent recognition, we will discuss our invention in that context.

Figure 1:
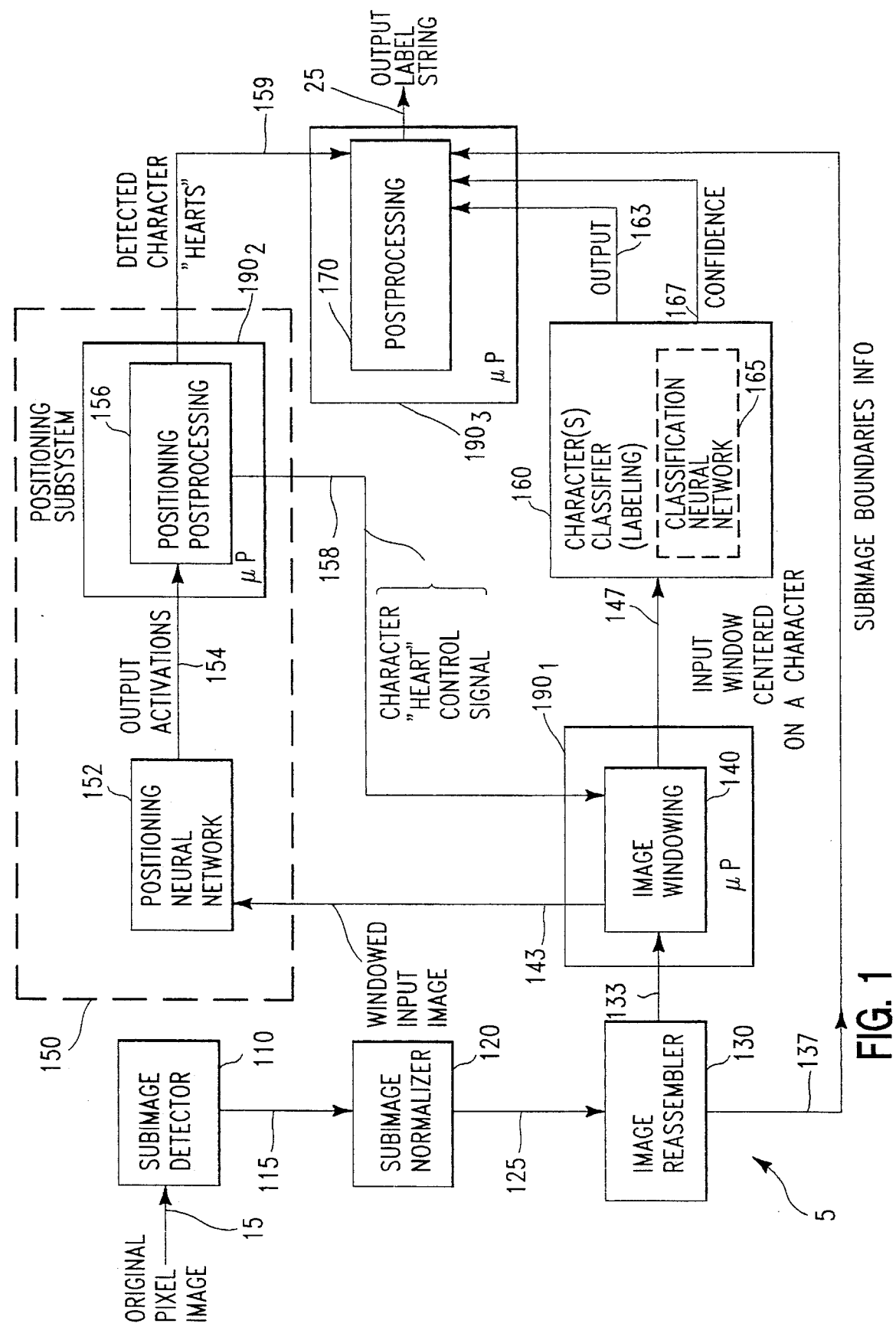
FIG. 1 depicts a block diagram of an embodiment of optical character recognition (OCR) system 5 constructed in accordance with the teachings of the present invention.

FIG. 1 depicts a block diagram of an embodiment of OCR system 5 constructed in accordance with the teachings of the present invention. Broadly speaking, this system parses an incoming image into appropriate scaled sub-images, with each sub-image containing a character(s), locates the center ("heart") of that character(s) within the sub-image through use of a sliding window and a positioning neural network, routes that sub-image to a character classifier, and produces an output label string containing the recognized character(s). Advantageously, our inventive neural network position detector produces an array of outputs which collectively locates the center of each character, at a given horizontal pixel position of the sliding window, with increased accuracy than which occurs through systems, as heretofore taught in the art, that provide a single centered/not centered indicia.

Specifically, system 5 contains sub-image detector 110, sub-image normalizer 120, image reassembler 130, image windowing block 140, character(s) classifier 160, positioning subsystem 150 which itself contains positioning neural network 152 and positioning postprocessor 156, and postprocessor 170. Image windowing block 140, positioning postprocessor 156 and postprocessor 170 are collectively implemented in software executing on either a single or, as shown, separate microcomputers 190$_1$, 190$_2$ and 190$_3$, respectively. Inasmuch as the design, programming and use of microprocessor circuitry are extremely well known in the art, for the sake of brevity, the following discussion will only address those software operations that are germane to our invention.

To facilitate understanding, throughout the following discussion of FIG. 1, the reader should also simultaneously refer, for simplicity, to FIG. 3A, the latter figure diagrammatically depicting the sequence of high-level operations performed by system 5, shown in FIG. 1, on illustrative input field 310 of handwritten characters. FIG. 3A illustrates a simple case where each scaled sub-image, as defined below, contains exactly one character.

In operation, an incoming, typically scanned, digitized pixel image, that contains handwritten characters to be recognized, is divided (by circuitry not shown) into horizontal rows, typically 190 pixels high (though this height is not critical), hereinafter called "fields". Each field, such as field 310—which is not drawn to scale, is expected to contain one and usually more handwritten characters though, given the variability of human handwriting from one person to the next, the size and center location of each such character within the field often varies widely among the characters. Field 310 illustratively contains seven characters. To simplify the ensuing center detection and character recognition tasks, the incoming pixels in each field are first preprocessed. In doing so within system 5, these pixels are first applied, over leads 15, to sub-image detector 110. This detector locates blank columns that are sufficiently wide, typically 4–6 pixels, to serve as sub-image boundaries between adjacent characters in the field. Each resulting sub-image in FIG. 3A, such as boxed sub-images 320 of which sub-image 321 is illustrative, will contain a separate character. To sharply reduce the number of separate training patterns that need to be applied to the two neural networks, as discussed below that are separately used in character "heart" detection and character recognition, and thus significantly simplify these networks, all sub-images, appearing on leads 115, are then normalized to a common size, typically 20 pixels in height, by sub-image normalizer 120. The, resulting normalized sub-images, such as those shown as sub-images 330, are applied, via leads 125, to image reassembler 130. This block reassembles the normalized sub-images, in the exact sequence detected, back into a single field, such as field 335, having a height of 20 pixels. To simplify the following discussion, from hereon, a "field" will be that produced by image reassembler 130, unless specifically noted to the contrary. Image reassembler 130 provides sub-image boundary address information, via leads 137, to postprocessing block 170. Though, as will become evident based on the discussion below, this step is not necessary, providing this address information expedites postprocessing. Blank 12-pixel wide columns are prepended and appended to each field in order not to miss first and last characters therein. Through use of image reassembler 130, sub-images are assembled, as sub-fields, with as little as a four to six pixel gap between adjacent sub-fields, into a common field, thereby eliminating any further need to manipulate and process much larger sub-images. Two blank lines are added both along the top and bottom of the recombined field as preferred by the so-called "Gabor projection" technique; this technique is described in A. Shustorovich, "A Subspace Projection Approach to Feature Extraction: The Two-Dimensional Gabor Transform for Character Recognition" to appear in *Neural Networks*, 1994, Vol. 7, No. 5. Sub-image detector 110, sub-image normalizer 120 and image reassembler 130 are all conventional and well known in the art and, for optimum performance, are, each implemented through high-speed dedicated programmable digital hardware rather than a programmed general purpose microcomputer. Sub-field boundary information is also provided, via leads 133, to image windowing block 140. Though not specifically shown and not relevant to the present invention, the binary pixels in the sub-images are also preprocessed to exhibit a simulated gray scale.

Using the sub-field address information, image windowing block 140 crops (parses) a sequence of 24-pixel high by 36-pixel wide portions (hereinafter referred to as a "window"), each with a specific horizontal offset (step size) with respect to the next such portion, from a field and passes that windowed image portion, via leads 143, to positioning subsystem 150 and specifically positioning neural network 152 therein. Consequently, a sequence of positionally staggered, overlapping 36-pixel wide windows that collectively traverses across the entire field, i.e. a so-called "sliding window", results. Each of these windows, as will be shortly become evident, is essentially and separately convolved with the field portion. Network 152, specifically depicted in FIG. 2 and discussed in detail below, provides twelve separate neural activation outputs, via leads 154 shown in FIG. 1, which collectively signal whether a character in the field is centered, i.e. has its "heart", coincident with any 1-pixel wide column within a 24-pixel high by 12-pixel wide array located within the center of each 24-pixel high by 36-pixel wide window, as that window is then positioned relative to the field. Each of the neural activations corresponds to one of twelve horizontal pixel positions along this array. The precision at which a human operator can mark a character "heart" is relatively low, typically within a resolution of one or two pixels at best. As such, positioning neural network 152 is trained to produce target high level, i.e. one, output activations at three consecutive output nodes (output neurons) if the character "heart" exists at a pixel position corresponding to that associated with the middle of these three nodes. The rest of the neural activation outputs are set to low, i.e. zero. In this manner, the output waveform for any one of the 12 output neurons exhibit "bumps" of activation that indicate each character "heart" as the sliding window effectively passes over it. In order to permit all or most of the characters centered at each of the 12 output node pixel positions to fit inside the window, two twelve-pixel wide column buffer positions, on both the far left and right sides of the window, though without corresponding output nodes are provided within positioning neural network 152.

The activation outputs provided by positioning neural network 152 are routed, via leads 154, to positioning postprocessing block 156. This block accumulates the activation outputs for the same pixel position in the field, but corresponding to different window positions, and then averages, typically on a weighted basis as described in detail below, these activation outputs. This averaging imparts a required level of robustness into the detected character "heart" position. By virtue of averaging, a speed-robustness tradeoff exists inasmuch as a small sliding step size, such as one or two pixels, can be chosen to produce increased positional and character recognition accuracies but at a cost of additional processing time and hence reduced character recognition throughput. We have found that a step size of four or six pixels, as illustratively used below, provides excellent performance in terms of throughput and recognition accuracy.

In addition to activation output accumulation and averaging, position postprocessing block 156 also filters the averages and generates a character-heart index, $\chi$. Then, block 256 thresholds a thus-obtained $\chi$-wave (a waveform of the index values) and thereafter, based on another weighted average of individual $\chi$-values weighted by corresponding horizontal pixel positions, determines the horizontal pixel position of the character "heart". A waveform of a character-heart index, i.e. a $\chi$-wave, with "bumps" (local peaks) corresponding to the sequence of characters in field 335 is shown in FIG. 3A as waveform 340. The particular operations undertaken by positioning postprocessing block 156 are graphically depicted in FIGS. 5–9 and in flowchart form, for an actual software implementation of this block as Positioning Postprocessing Routine 1000, in FIG. 10, and are discussed in detail below.

Positioning postprocessing block 156, shown in FIG. 1, provides a control signal, i.e. the CHARACTER "HEART" CONTROL SIGNAL, on lead 158, to image windowing block 140 to indicate when a character center position ("heart") has been found and the value of the corresponding horizontal pixel position of this "heart".

Once the "hearts" for all the characters in the field have been found, as indicated for field 335 by solid vertical black bars, e.g. bar 351, in illustrative waveform 350 in FIG. 3A, and appropriate notification has been provided thereof over leads 157 158 to image windowing block 160 shown in FIG. 1, block 140 successively parses the field to pass a 24-pixel by 24-pixel portion thereof, of which portion 361 is typical, centered about each character in sequence, via leads 147, to character(s) classifier 160. This classifier, also illustratively separate neural network 165 (illustratively shown in FIG. 2 and discussed in detail below), recognizes the character within each 24-pixel by 24-pixel field portion, all of these portions for field 335 shown in FIG. 3A being collectively identified as portions 360. Network 165 has been trained to recognize single characters. The output of this particular network is a series of output activations on leads 163 with each such output corresponding to a separate character for which this particular network has been trained. Classifier 160 also produces a numerical value on lead 167 as a measure of the confidence at which the classifier has recognized the character currently applied to it. The confidence measure is determined as a conventional function of the activation output values from network 165. Though classifier 160 is discussed herein and is preferably implemented as a separate neural network, this classifier is not so limited and can be implemented through any preferably trainable generic pattern recognition circuit or process.

To validate the character recognized by classifier 160, positioning postprocessing block 156 also routes the horizontal pixel position, in the field, of each detected character "heart" (DETECTED CHARACTER "HEARTS"), via leads 159, to postprocessing block 170. In addition, positioning postprocessing block 156 also provides the combined character-heart index value, $\chi$, for that character "heart" to block 170.

Postprocessing block 170 implements a relatively simple rule-based two-level reject process in generating an output character string given the outputs provided by character(s) classifier block 160 and positioning sub-system 150. The first level is associated with characteristics of the character-heart index waveform, i.e. the $\chi$-wave itself, while the second level, particularly aimed at rejecting dubious characters, is associated with a confidence value generated by character(s) classifier 160 for the character that has been recognized. These levels can function on an inter-related basis, as described below.

On the first level, if the combined character-heart index identifies an activation group that is sufficiently high and wide to indicate a character "heart", but the highest individual character-heart index, i.e. $\chi$-value, in the group is lower than a pre-defined threshold, postprocessing block 170 generates a reject signal (not specifically shown). In this case, a human operator can determine what exactly caused the reject. Alternatively, if positioning subsystem 150 cannot find a character "heart" within the boundaries of a corresponding sub-image, the postprocessing block also generates a reject signal. This latter situation may occur in response to a "clump" of scanner noise, or to an extremely wide or unusual character for which the positioning network has not been trained. Additionally, postprocessing block 170 determines and monitors the width of each sub-field based upon boundary address information provided over leads 137 from image reassembler 130. If the number of separate character "hearts" detected by positioning sub-system 150 is inconsistent with the sub-field width, i.e. is greater than that which would be expected for a given width, then postprocessing block 170 also generates a reject signal. If two adjacent character "hearts" are too close to each other, postprocessing block 170 will organize "competition" between two detected character "hearts" and decide the valid character(s) based on pre-defined rules. For example, if the distance from one competing character "heart" to the next is less than, e.g. ten pixels, and the labels (symbols) of the recognized characters are relatively wide and different, such as either the numeral "2" or "5", postprocessing block 170 may ignore, for certain recognized characters, that one of the two characters having the lower combined character-heart index value, i.e. $\chi$-value, such as for that shown by open vertical bar 356 in FIG. 3A, but permit both characters to exist if they are both recognized as being the numeral "1".

On the second level, if the activation outputs and the confidence measure produced by character(s) classifier 160 are numerically too low or these activation outputs are too similar to each other, the corresponding character is also rejected. If a reject signal is generated during the processing of a field, this field is saved to a separate file (not specifically shown) by postprocessing block 170 for future viewing by a human operator. Within this file, postprocessing block 170 represents positioning subsystem rejects by question marks displayed in corresponding pixel positions of the field, while each rejected character is represented, in red, by its "best-guess" character symbol. Postprocessing block 170 routes the resulting character string, such as illustrative string 370 shown in FIG. 3A, to output leads 25 for subsequent downstream processing.

Figure 3B:
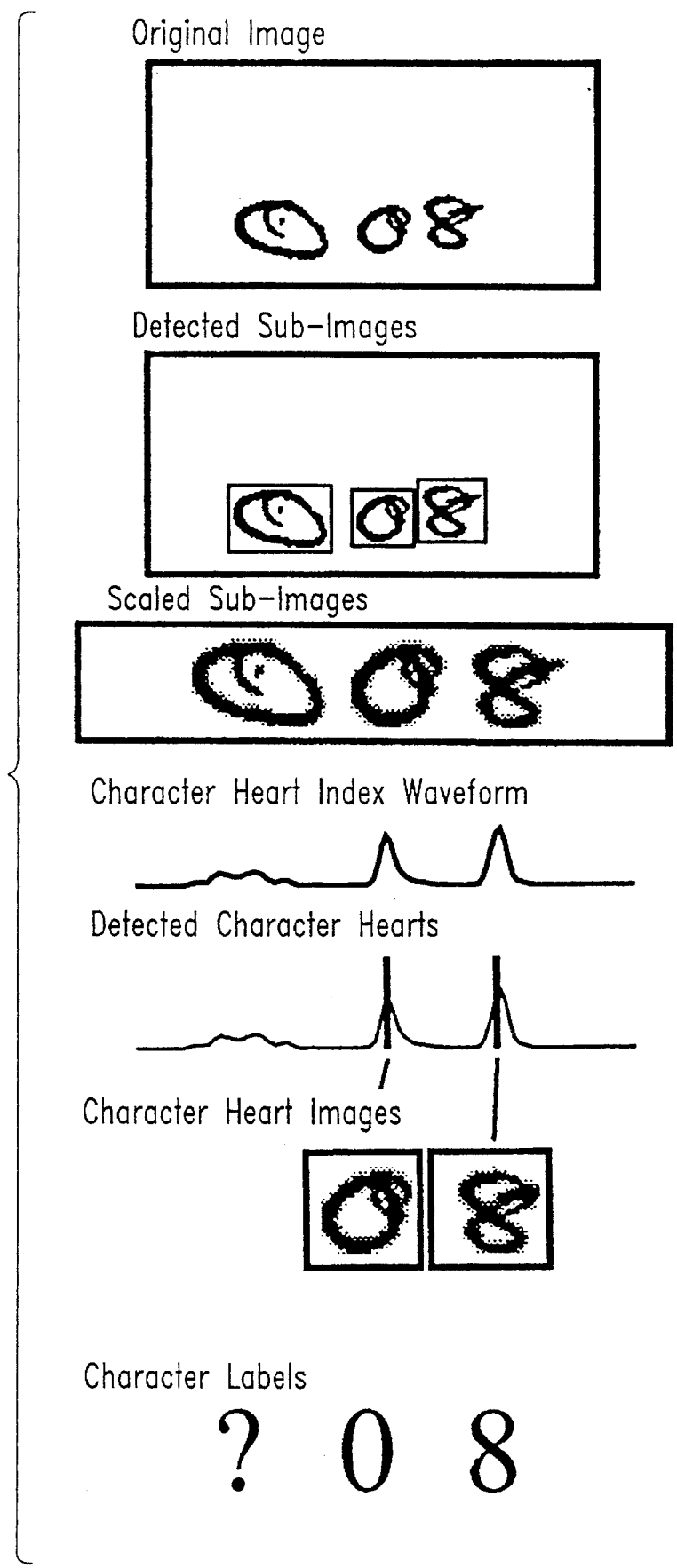
Figure 3C:
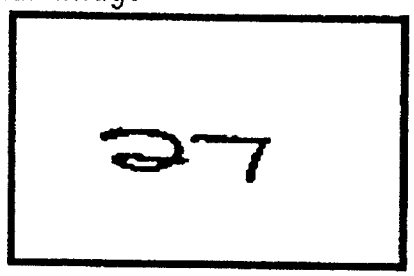
Figure 3C:
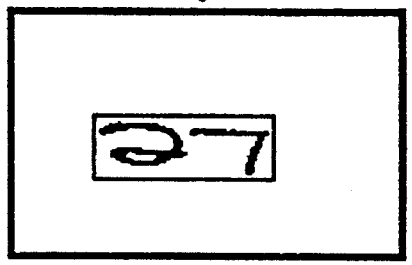
Figure 3C:
Figure 3C:
Figure 3C:
Figure 3C:
Figure 3D:
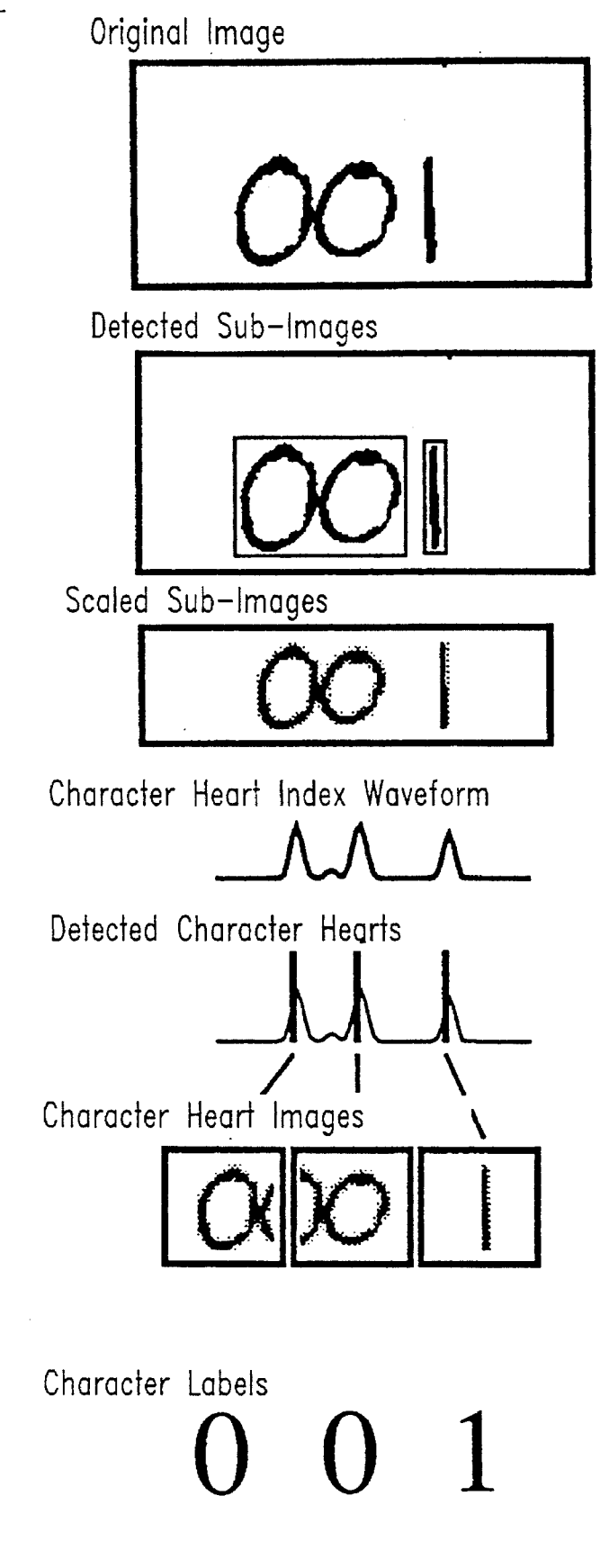
Figure 3E:
Figure 3E:
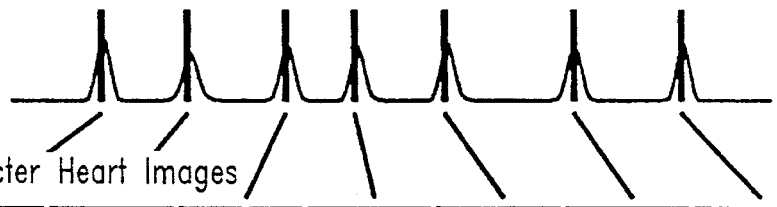
Figure 3F:
Figure 3F:
Figure 3F:

To appreciate the operation of our invention in determining the position of character "hearts" in more realistic situations than that depicted in FIG. 3A, the reader should now consider FIGS. 3B–3F. Each of these latter figures depicts the results of the operations, as described above, for sub-images that contain, e.g., more than one character and, in some instances, touching characters. Inasmuch as the same operations, discussed above though with different sub-image data, generate the results shown in these figures, for the sake of brevity, we will not discuss FIGS. 3B–3F in any detail.

Figure 2A:
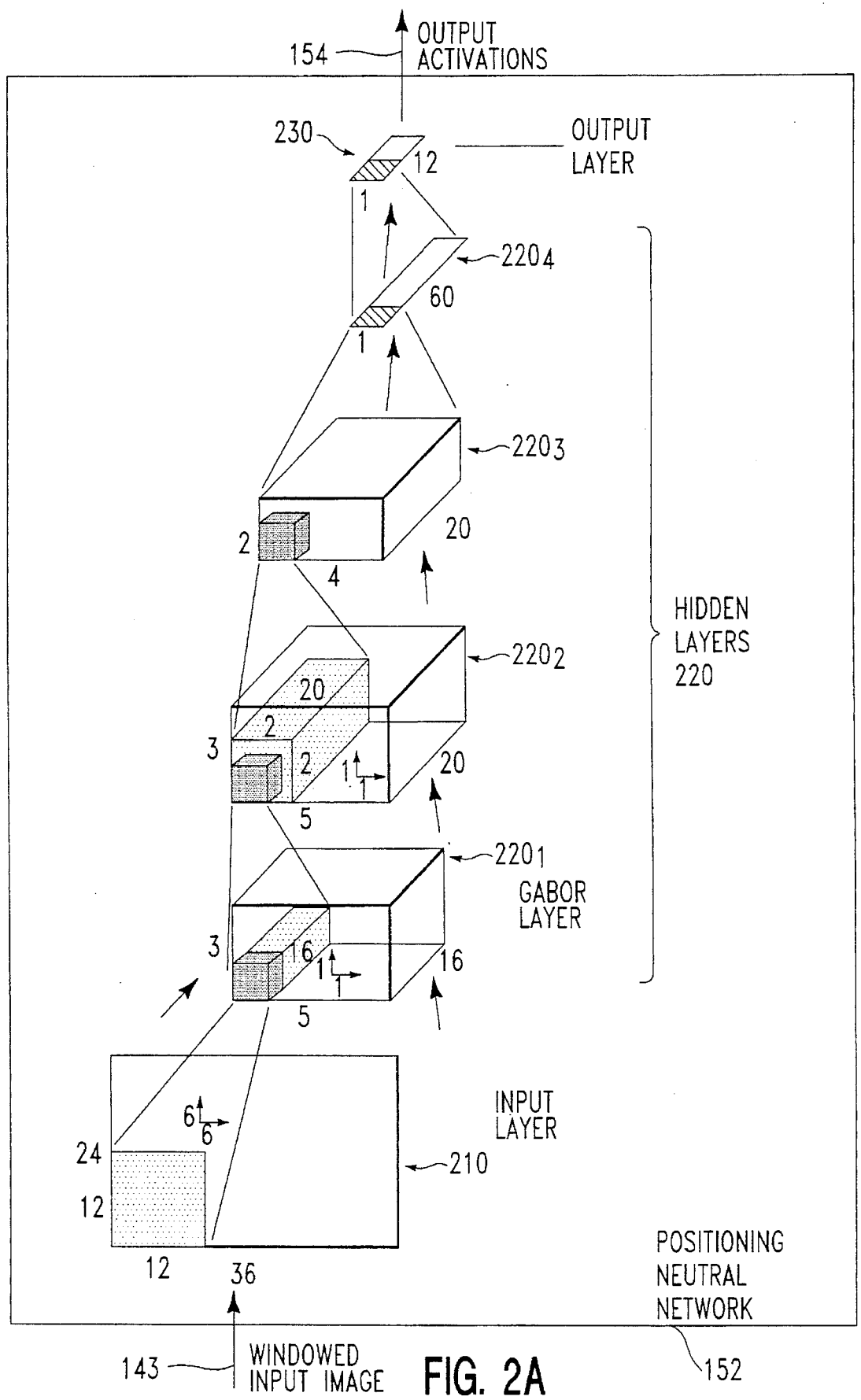
FIGS. 2A and 2B collectively depict the topological structure of neural networks used within positioning subsystem 150, and specifically positioning neural network 152 therein, and character(s) classification block 160, specifically classification neural network 165 therein, all of which is shown in FIG. 1.

FIG. 2A depicts an illustrative topological structure of positioning neural network 152 and classification neural network 165, both of which are shown in FIG. 1.

As shown in FIG. 2A, positioning neural network 152 is formed of six distinct layers: 24-pixel high by 36-pixel wide input layer 210, hidden layers 220 and 12-neuron output layer 230. As the sliding window traverses in stepped fashion (with the step size being 12/m where m is an integer) across the field, at each resulting location of the window, each pixel in the "windowed" portion of the field, i.e. underlying the window, is applied to a two-dimensionally located corresponding input neuron in input layer 210. The outputs of the input neurons in layer 210 are applied, as input, to hidden layers 220, formed in succession of: Gabor layer $220_1$ and trainable hidden layers $220_2$, $220_3$ and $220_4$. Gabor layer $220_1$ implements Gabor projections and uses 12×12 local receptive fields (LRFs) with fixed weights and bias values. The step between adjacent LRFs, in layer 210, is six pixels in both directions. Sixteen Gabor basis functions are preferably used with circular Gaussian envelopes centered within each LRF; we use both sine and cosine wavelets in four orientations and two sizes. For a detailed description of these basis functions, see, e.g., J. Daugman, "Complete Discrete 2-D Gabor Transforms by Neural Networks for Image Analysis and Compression", *IEEE Transactions of Acoustics, Speech and Signal Processing*, Vol. 36, No. 7, 1988, pages 1169–1179. All sixteen projections from each LRF constitute the input to a column of 20 hidden neurons in hidden layer $220_2$; thus, this layer is organized as a three-dimensional array of 3×5×20 neurons. The output of layer $220_2$, in turn, is fed as input to hidden layer $220_3$. This latter layer also uses LRFs, though in layer $220_2$, organized as a three-dimensional array of 2×2×20 neurons with a step of 1×1×0. Units in hidden layer $220_3$ are duplicated twenty times thus forming a three-dimensional array of 2×4×20 neurons. The fourth hidden layer, i.e. layer $220_4$, contains a single column of 60 neurons fully connected to previous layer $220_3$. The neural outputs of layer $220_4$ are fully connected as input to neurons in 12-neuron output layer 230. The resulting 12 neural activation outputs of layer 230 are applied, via leads 154, as output of positioning neural network 152.

Figure 2B:
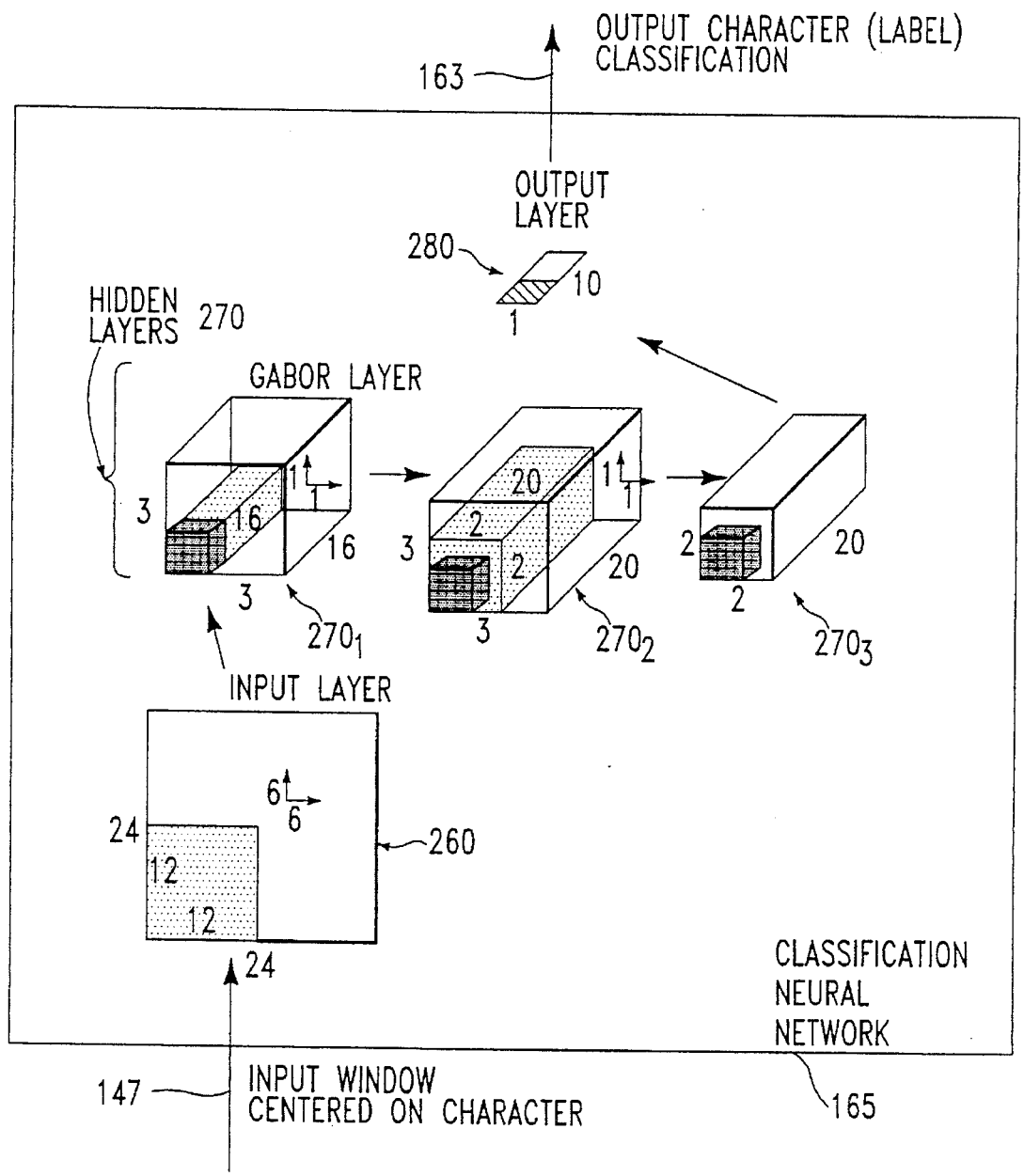

The structure of classification neural network 165 is highly similar to that of positioning neural network 152. In particular, network 165 is formed of five distinct layers: 24-pixel high by 24-pixel wide input layer 260, hidden layers 270 and output layer 280. Each pixel in the 24-pixel by 24-pixel (windowed) field portion produced by image windowing block 140 (see FIG. 1) and appearing on leads 147 is applied, as shown in FIG. 2B, to a spatially corresponding input neuron in input layer 260. The outputs of the input neurons in layer 260 are applied, as input, to hidden layers 270, formed in succession of: Gabor layer $270_1$, and trainable hidden layers $270_2$ and $270_3$. Gabor layer $270_1$ implements the Gabor projections, identically as does Gabor layer $220_1$, and uses 12×12 local receptive fields (LRFs) with fixed weights and bias values. The step between adjacent LRFs, in layer 260, is six pixels in both directions. Similar to layer $220_1$, all sixteen projections from each LRF constitute the input to a column of 20 hidden neurons in hidden layer $270_2$; thus, layer $270_2$ is organized as a three-dimensional array of 3×3×20 neurons. Also, layer $270_2$ uses shared weights. The output of layer $270_2$, in turn, is fed as input to hidden layer $270_3$. This latter layer also uses LRFs, in layer $270_2$, organized as a three-dimensional array of 2×2×20 neurons with a step of 1×1×0. Units in hidden layer $220_3$ are suitably duplicated thus forming a three-dimensional array of 2×2×20 neurons, for a total of 80 neurons in this layer. The neural outputs of layer $220_3$ are fully connected as input to neurons in 10-neuron output layer 280. Inasmuch as neural network 165 is tailored to recognizing numerical digits, i.e. "0" through "9", output layer 280 has ten neurons, each of which is associated with a different one of the ten digits. The resulting ten neural activation outputs of layer 280 are applied, via leads 163, as output of classification neural network 165. With a suitable number of output neurons and an appropriate network topology, network 165 could alternatively be trained to recognize a different character set than just numerical digits, as occurs here.

Network 152 is trained to recognize the horizontal pixel location of a character center ("heart"), for each character within an entire pre-defined set of training characters, as the 24-pixel high by 12-pixel wide array at the center of the sliding window moves across that character. Network 165 is trained to recognize each individual training character, here illustratively numeric digits "0" through "9", centered within a 24-pixel by 24-pixel sub-field. Illustratively, both of these networks are trained through conventional back propagation using pre-defined training sequences in order to properly adjust internal weights and bias values within the hidden layers therein. Inasmuch as the particular manner through which each of the networks is trained is not pertinent to our invention, this aspect will not be discussed in any further detail. Since back propagation is conventional and widely known in the art, for additional details on back propagation, the reader is simply referred to, e.g., D. E. Rumelhart et al, *Parallel Distributed Processing*, Vol. 1, pages 328–330 (©1988, MIT Press) and J. A. Freeman et al, *Neural Networks—Algorithms, Applications and Programming Technique*, pages 89–125 (©1991: Addison-Welsey Publishing Company, Inc.).

Figure 4:
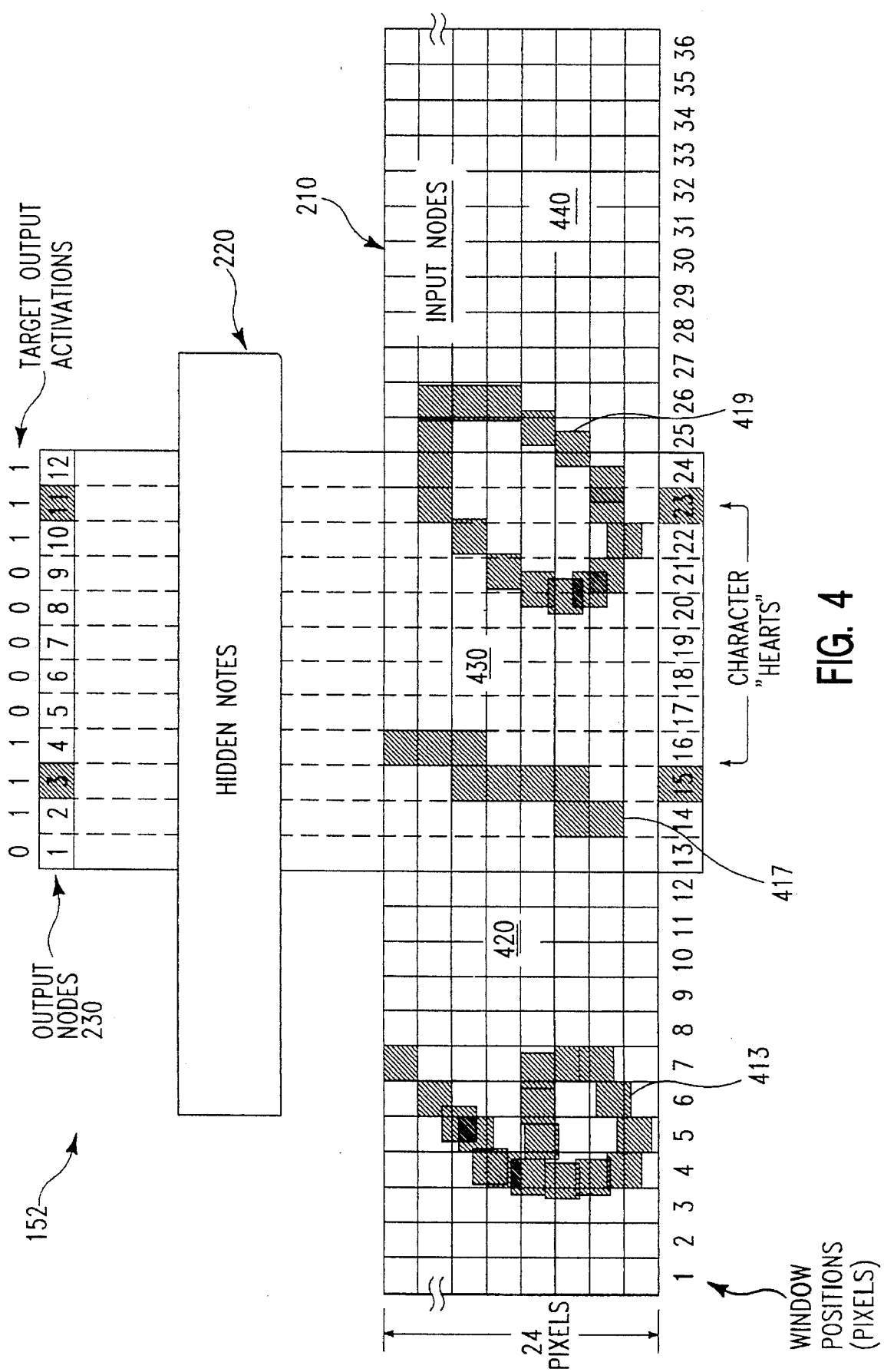
FIG. 4 diagrammatically depicts three illustrative scaled characters in an input field applied, via a sliding window formed of a 24×36 pixel array, to positioning neural network 152, shown in FIG. 1, and the positional correspondence of the output nodes of this network relative to a current position of the window with respect to the input field.

FIG. 4 diagrammatically depicts three illustrative scaled characters, specifically numerals "6", "1" and "0", in an input field applied, via a sliding window formed of a 24×36 pixel array, to positioning neural network 152 and the positional correspondence of the output nodes of this network relative to a current position of the window with respect to the input field. As discussed, input nodes 210 of network 152, receive data from the array of 36×24 pixels over which the window is positioned. This array can be viewed as containing central 12×24 pixel array portion 430 situated between 12×24 pixel array portions 420 and 440. Neural positioning network 152, though receiving pixel data from the full array of 36×24 pixels, determines whenever central portion 430 of the sliding window is situated over a center, i.e. "heart" of a character(s), such as the numerals "1" and "0" shown here as having centers then positioned over horizontal pixel positions 15 and 23 within the sliding window. When that occurs, the output node(s), here illustratively output nodes 3 and 11 designated by shading, corresponding to the particular horizontal pixel positions within central window portion 430, produces a high valued activation output to indicate that at that window position in time the character "hearts" existed at those pixel positions. In addition, immediately adjacent output nodes, here illustratively nodes 2, 4, 10 and 12, are also trained to each produce a high-valued activation output. All the other output nodes produce a low level, i.e. zero, activation output; and so forth for character "hearts" coincident with other pixel positions in central portion 430. As the window is slid to the right over these characters, the characters will in effect move to the left relative to the window. Hence, the high level output activations corresponding to each character "heart" will also shift, by the positional amount through which the window steps to the right, to increasingly leftward output nodes, as shown in FIG. 5 and discussed below, until that character "heart" is no longer coincident with any pixel position within central portion 430.

Figure 5:
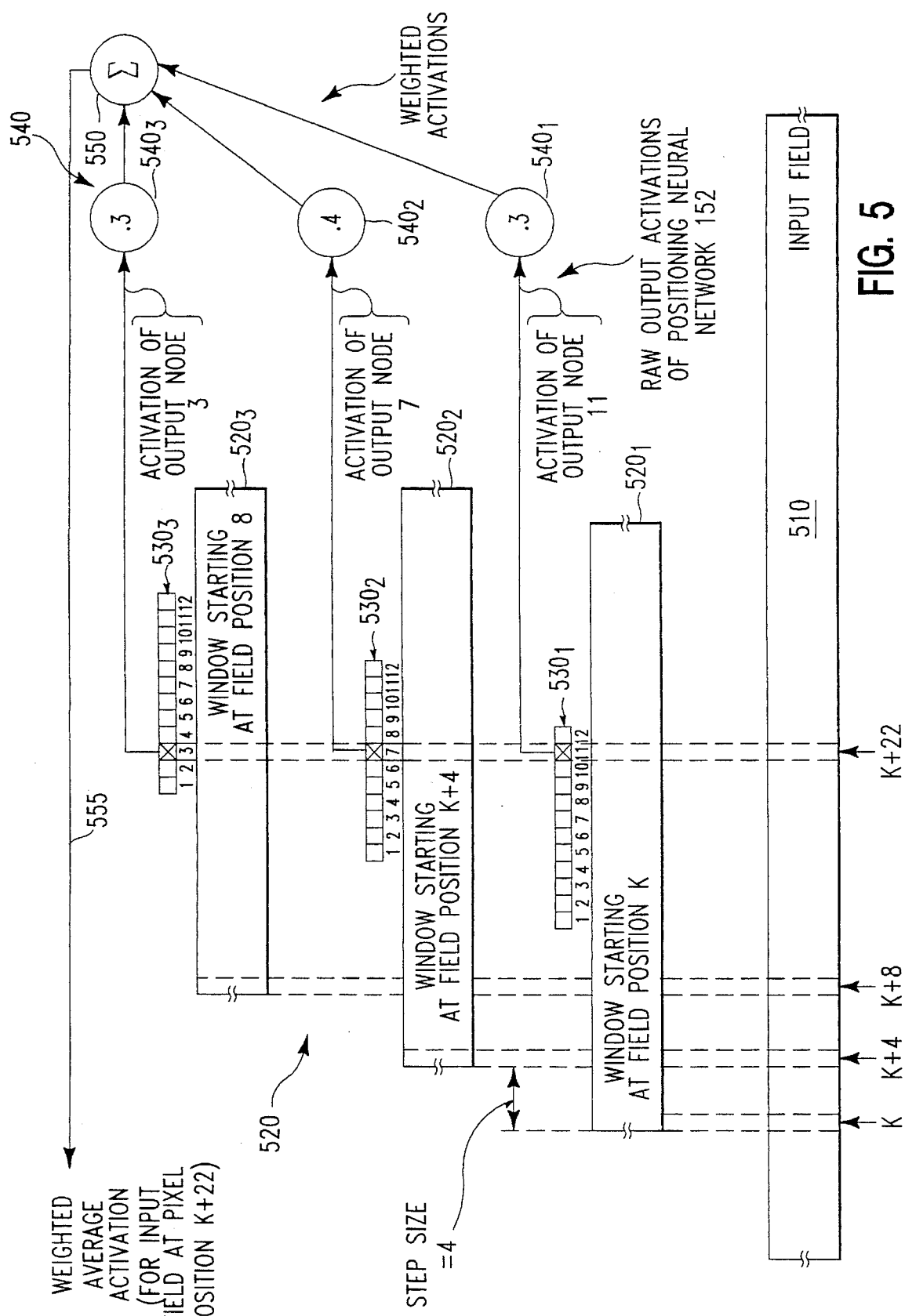
FIG. 5 diagrammatically depicts the neural activation outputs of a sliding window, such as that shown in FIG. 4, for an illustrative step size of four pixels, as that window traverses across the input field, and the averaging of these outputs, all illustratively occurring within inventive system 5, specifically positioning postprocessing block 156, shown in FIG. 1.

To fully appreciate the relationship between positional shifts in the sliding window with respect to a character "heart" coincident with the window, consider FIG. 5. This figure diagrammatically depicts the neural activation outputs of sliding window 520 for an illustrative step size of four pixels, as that window traverses, in a step-wise fashion, across the input field, as well as the averaging of these activation outputs.

As shown, as window 520 is stepped, at four pixel increments, across field 510, from starting (leftmost) position K to position K+4 to finally position K+8. Assume, for purposes of illustration, that a character (net specifically shown) is centered about, e.g., illustrative pixel position K+22 within the field. Consequently, as the window steps across the character to effectively form at correspondingly different times windows $520_1$, $520_2$ and $520_3$, the "heart" of this character, through the entire positioning neural network, will produce, an output activation at each of three output nodes, specifically nodes 11, 7 and finally 3, spaced at four pixel increments. This results by virtue of the character "heart", situated at pixel position K+22 in the field, being spatially coincident, at successive times, with corresponding horizontal (field) pixel positions 11, 7 and 3 within the central portion of the sliding window and associated with output nodes 11, 7 and 3, respectively, of the positioning neural network. The horizontal (field) pixel positions of central portion of the sliding window is represented by window portions $530_1$, $530_2$ and $530_3$. The three different activation outputs for the common pixel position, K+22, in the input field, are combined through a weighted average. The activation outputs for output neurons 11, 7 and 3 are multiplied, through multipliers $540_1$, $540_2$ and $540_3$, respectively, by appropriate empirically defined weights. Though, as shown, the weights are chosen to be 0.3, 0.4 and 0.3 (for a total of "1"), to slightly favor pixel positions within central pixel positions within these window portions, we have found that the weights are not critical. A simple non-weighted average can be easily used instead. The resulting weighted activation outputs are then accumulated in summer 550 and routed, via lead 555, as a weighted average activation for pixel position K+22 in the field. If the step size were decreased, such as to two pixels, then each horizontal pixel position in the input field would be coincident, with an increased number of pixel positions, here six, within the central portion of the sliding window as the window slides across the field. Hence, a correspondingly larger number of separate output activations, here six, would be averaged together, for any one horizontal pixel position in the input field. As noted above, use of a smaller step size does produce an increasingly accurate average and hence increased positioning accuracy, though at a cost of increased processing time needed to form each of these averages.

Figure 6:
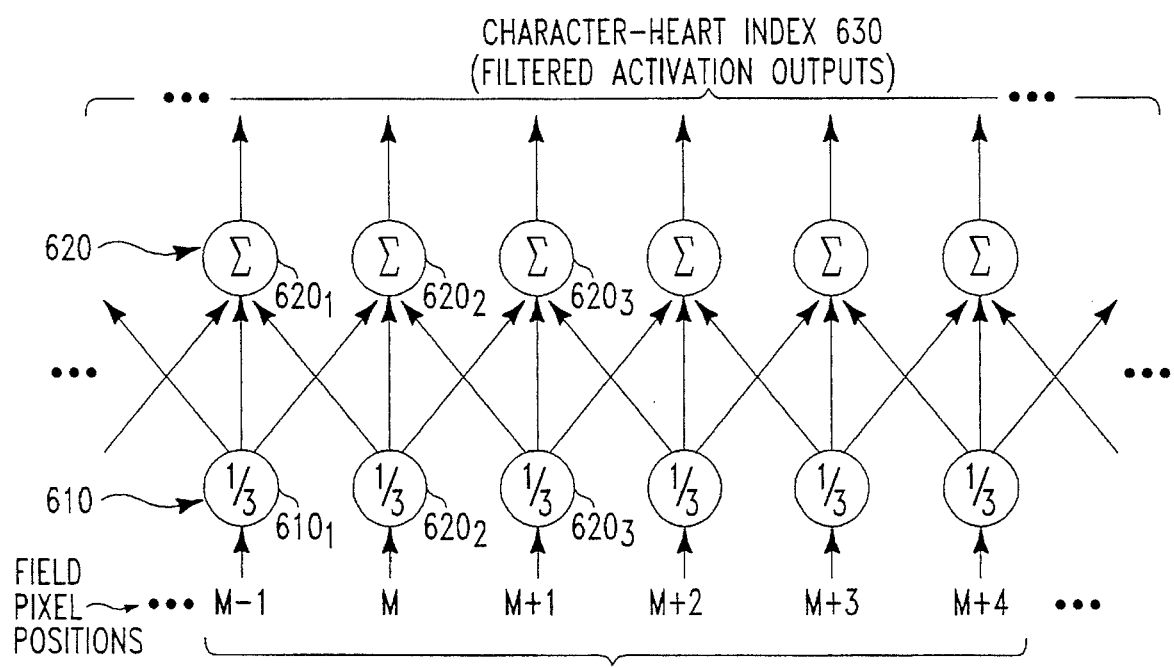
FIG. 6 diagrammatically depicts a process, occurring within inventive system 5, particularly positioning postprocessing block 156 shown in FIG. 1, to filter averaged activation outputs and produce a character-heart index, X.

Once the average for each horizontal pixel position in the field is determined, the averages are then digitally filtered, to remove irregularities and, by doing so, provide enhanced robustness, as shown in FIG. 6. As shown, this filtering merely involves averaging three adjacent averaged activations in order to produce a character-heart index value. This is accomplished by multiplying each averaged activation value, such as illustratively averaged activation values for horizontal (field) pixel positions M-1, M and M+1, by one third, such as through multipliers 610, illustratively multipliers $610_1$, $610_2$ and $610_3$. The output of each multiplier is routed to three adjacent summers within summers 620, illustratively summers $620_1$, $620_2$ and $620_3$, which sums its three inputs to provide a filtered output, all of these filtered outputs being filtered activations 630, previously called the character-heart index.

Figure 7:
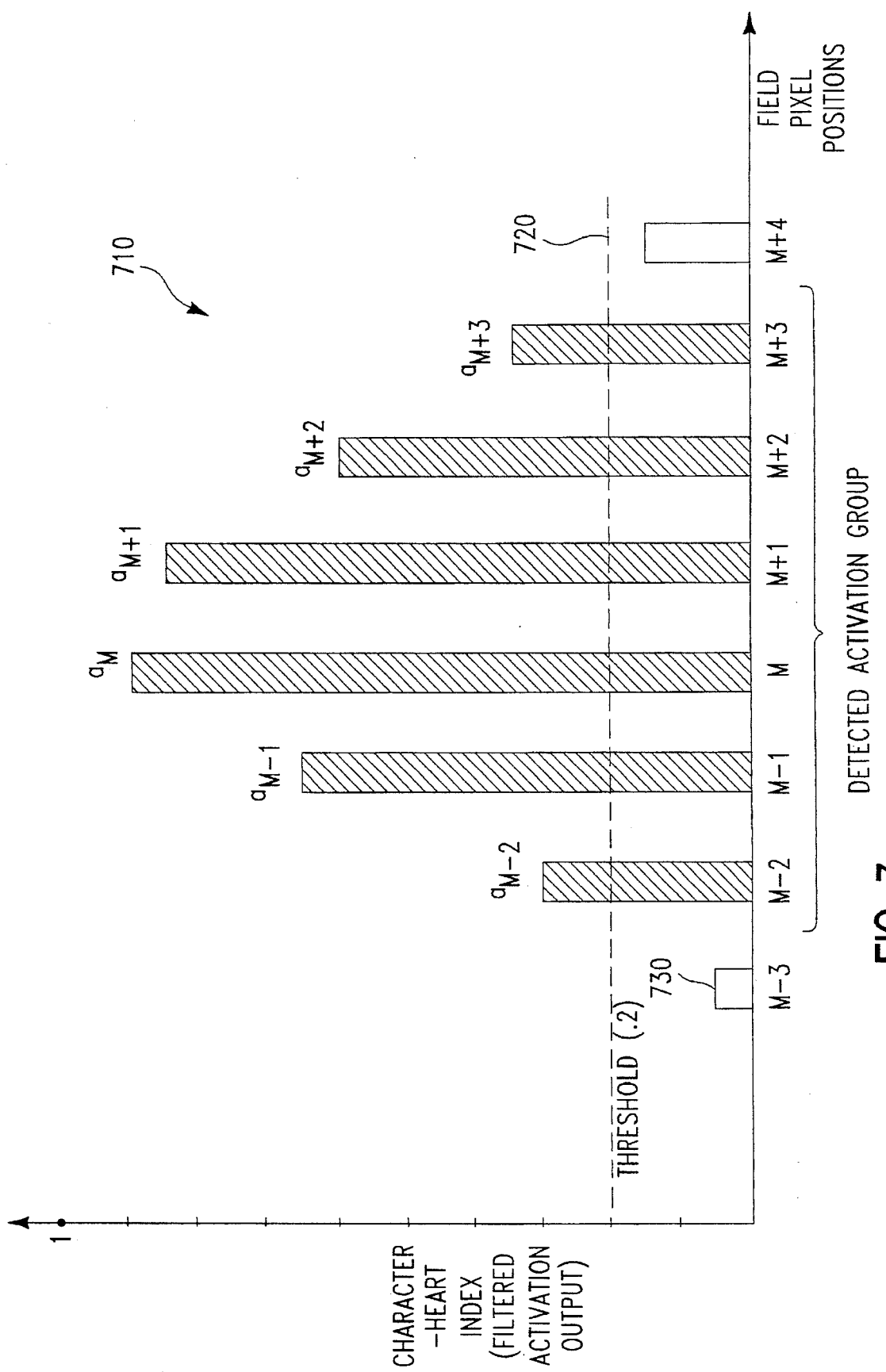
FIG. 7 diagrammatically depicts a thresholding process, also occurring within positioning postprocessing block 156, for thresholding the character-heart index values shown in FIG. 6 in order to generate a thresholded activation group.

After the character-heart index, X, values are determined, these values are thresholded as shown in FIG. 7. FIG. 7 depicts a typical activation group, i.e. the group of X-values, associated with a character "heart". As shown, the group assumes a typical Gaussian shape centered about the character "heart", here occurring at pixel position M. To remove artifacts, these index values are thresholded to form a thresholded activation group, with those index values having an amplitude lower than the threshold, here shown as dashed line 720 with a numerical value of 0.2, being rejected and set to zero. The threshold is pre-defined but empirically chosen. Furthermore, if only one pixel position (or a very small number of such positions) has a high amplitude, while the others are below the threshold, then the detected character, being too narrow, is likely to be noise and is rejected and also set to zero.

To reliably determine the pixel position of the character "heart" from the thresholded activation group, a weighted average, here a center-of-mass calculation, of the individual thresholded activation values is calculated. These calculations are diagrammatically depicted in FIGS. 8 and 9.

Figure 8:
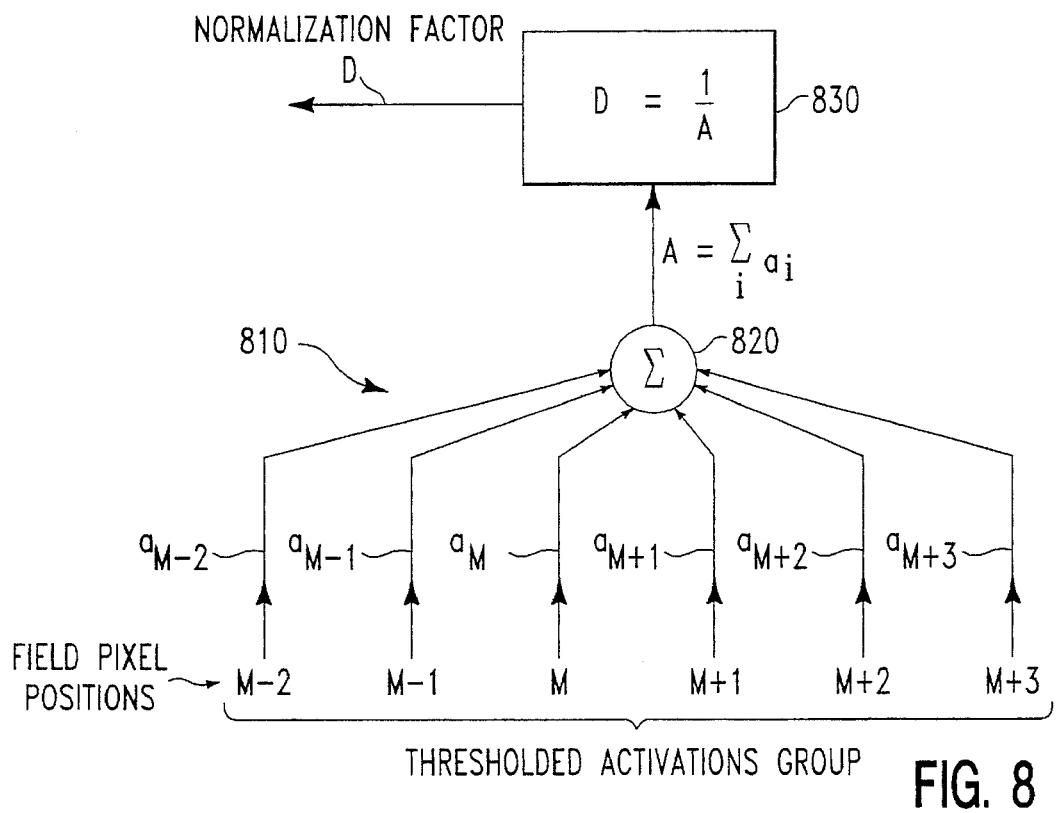
FIG. 8 diagrammatically depicts a process, also occurring within positioning postprocessing block 156 shown in FIG. 1, to determine a normalization factor (D) for the thresholded activation outputs shown in FIG. 7.

First, as shown in FIG. 8, a normalization factor, D, is determined for the thresholded activation group. This factor is determined by summing the thresholded activation output levels in this group, via leads 810 and summer 820, to form a sum of these values for which the normalization factor is then calculated, through block 830, to be the reciprocal of the sum.

Figure 9:
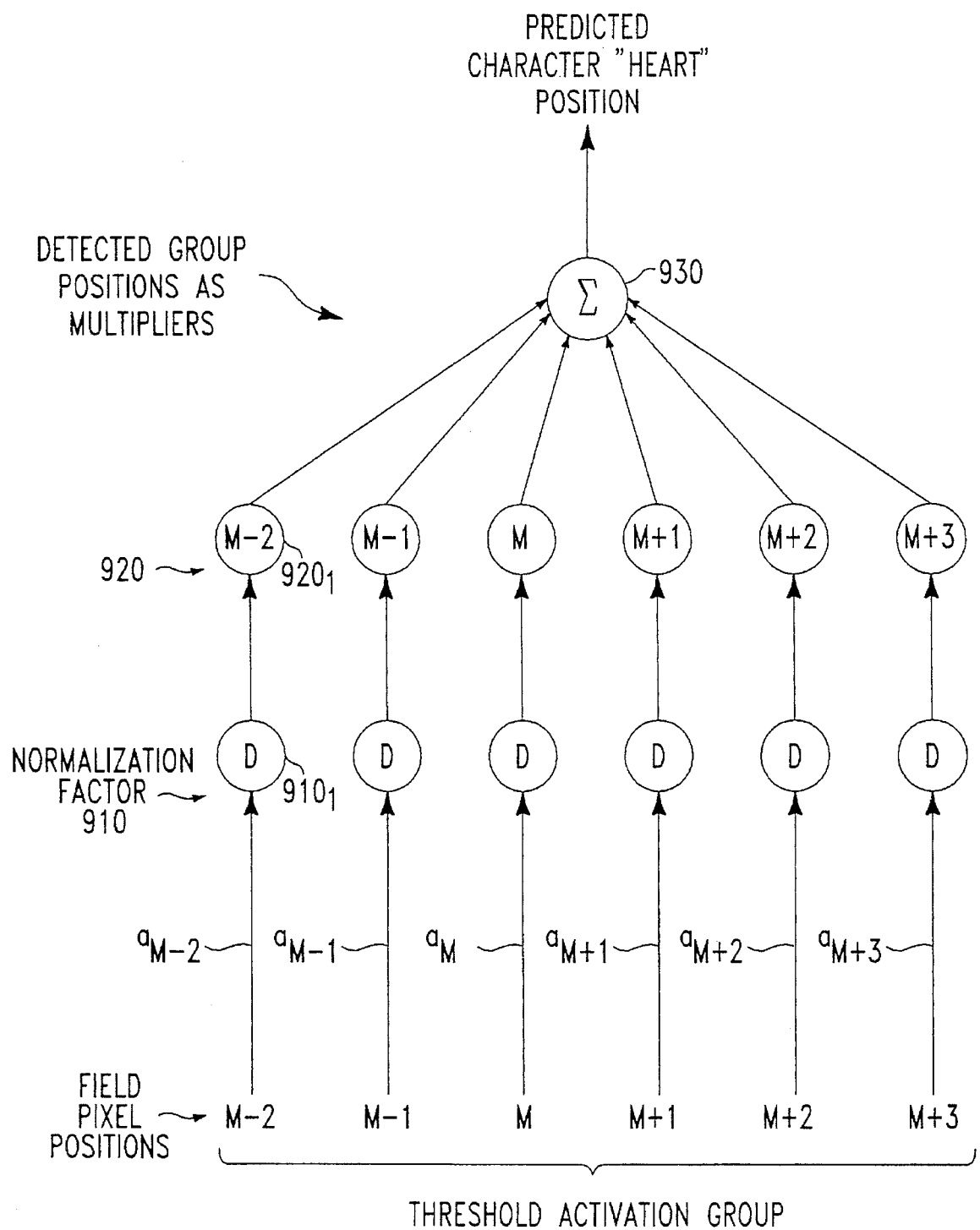
FIG. 9 diagrammatically depicts a process, also occurring within positioning postprocessing block 156 shown in FIG. 1, to generate, from the thresholded activation values shown in FIG. 8, a predicted position for an illustrative character "heart" in the input field.

Once the normalization factor is determined, as shown in FIG. 9, each activation output level is multiplied, via multipliers 910 of which multiplier $920_1$ is illustrative, by the normalization factor, D. The resulting normalized values are then each weighted, through multipliers 920 of which multiplier $920_1$ is illustrative, by a numeric value representing the field pixel position, e.g. here M-2, for that value. Alternatively, the weighted values can be calculated by weighting each of the field-pixel positions by corresponding normalized activation. The resulting weighted values are then all applied to summer 930 which produces a predicted "heart" position for the present character. This predicted "heart" position, in turn, is applied, via lead 159, shown in FIG. 1, to postprocessing block 170 to identify the center of the present character in the field.

Figure 10:
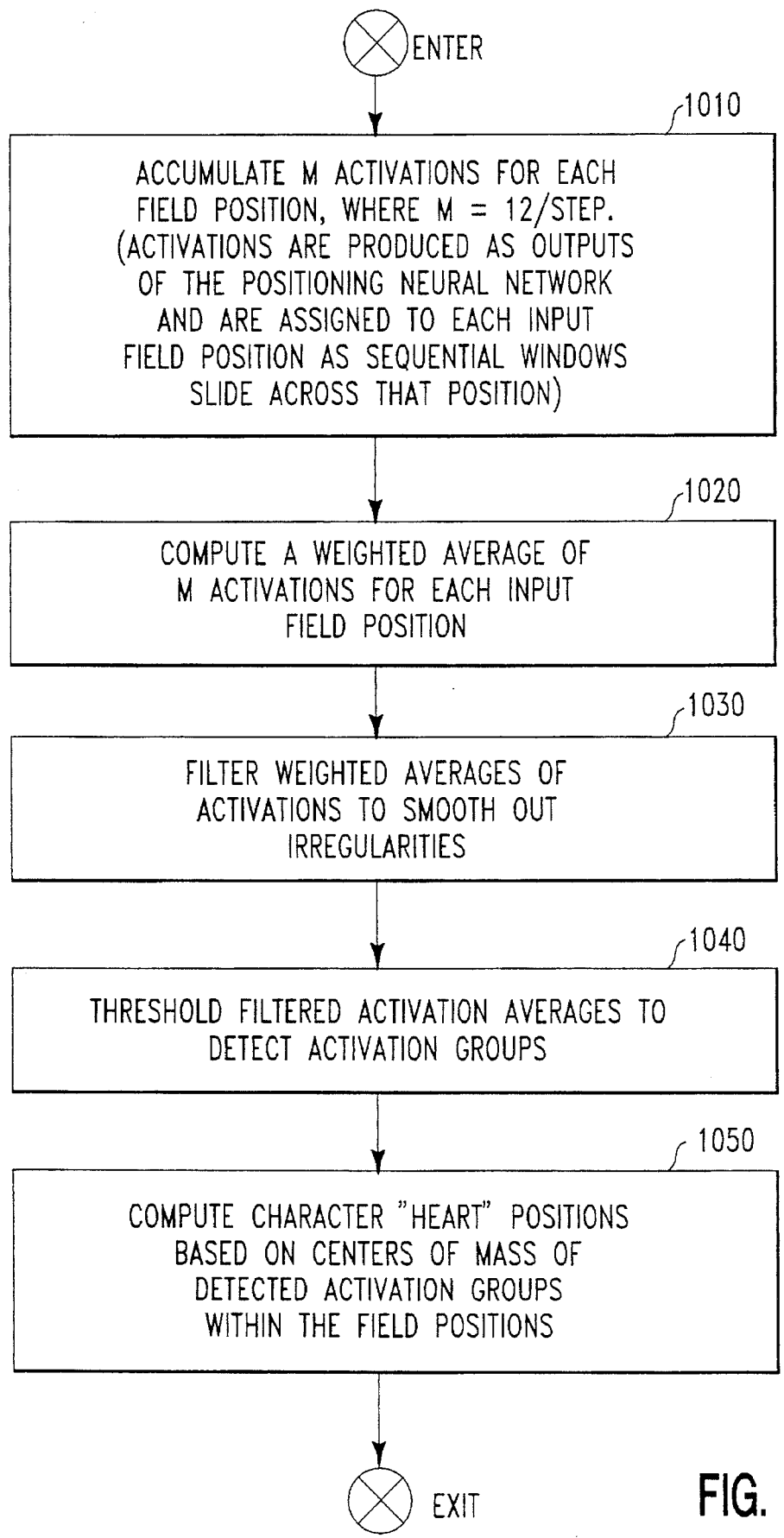
FIG. 10 depicts a flowchart of Positioning Postprocessing Routine 1000 which implements, through a microcomputer, the pixel accumulation and averaging process shown in FIG. 5 and the processes shown in FIGS. 6–9.

Inasmuch as positioning postprocessing block 156 is implemented, as noted above, in software, a flowchart of the relevant operations, implemented by this block and collectively shown by the averaging process in FIG. 5 and that shown in FIGS. 6–9, is depicted in FIG. 10, as Positioning Postprocessing Routine 1000.

Upon entry into routine 1000, execution proceeds to block 1010 which, when executed, accumulates, as discussed above, M separate activation output values, produced by the positioning neural network, for each field pixel position in the input field, where M=12/(step size). Once this occurs, block 1020 executes to compute a weighted average, in the manner discussed above, of these activation output values for each such pixel position in the input field. Thereafter, execution proceeds to block 1030 which filters, also in the manner discussed above, the averaged activation output values to form character-heart index values. These index values are then thresholded, as discussed above and via execution of step 1040, to yield a thresholded activation group. Finally, through execution of step 1050, a character "heart" position, is determined for the current character, in the manner discussed above, based on the thresholded activation group.

To assess the performance of our invention with respect to the art, we have simulated, through appropriate simulation software executing on a digital computer, the operation of our inventive system 5 against that of the well-known "Saccade" system, described in Martin et al, "Learning to See Where and What: Training a Net to Make Saccades and Recognize Handwritten Characters" (1993), appears in S. J. Hanson et al (eds.), *Advances in Neural Information Processing Systems*, Volume 5, pages 441–447 (Morgan Kaufmann Publishers, San Mateo, Calif.). Inasmuch as our inventive system 5 will be implemented digitally, as discussed above, through both high-speed dedicated programmable digital hardware for various functions, including the neural networks, and a programmed general purpose microcomputer for other functions, we expect the results of our simulation to very accurately predict the performance of our inventive system 5, once it is actually implemented in practice. The results of our simulations are shown in FIGS. 11 and 12.

We trained the neural networks, through a variant of conventional back propagation, with corresponding training sets based on 20,000 fields. For character "heart" detection, we used approximately 300,000 windows starting every fifth field pixel position of each normalized and reassembled field. For character recognition, we used approximately 80,000 characters extracted from the same fields. Since, we did not expect the positioning neural network to provide precision higher than one or two pixels, we trained the classification neural network on five copies of the centered characters in a database, with, for each of these characters, corresponding field shifts of −2, −1, 0, 1 and 2 pixels from a common centered position. The fields used for training were drawn from an NIST (National Institute of Standards and Technology) database which contains a set of approximately 273,000 samples of hand-drawn numerals, scanned at 300 pixels/inch, taken from census forms.

As shown both tabularly and graphically in FIG. 11, our inventive system out-performed the Saccade system with close to 90% of the character "hearts" found within a one-pixel precision. In contrast, the Saccade system, which does not rely on detecting character "hearts" through use of a separate neural network operating on an array of pixels but rather provides a single node output to indicate whether a character was centered or not, exhibited a one-pixel offset in locating most of the character "hearts". We have found that our inventive system is quite insensitive to touching characters.

As to character recognition accuracy, our system, as shown both tabularly and graphically in FIG. 12, consistently out-performed the Saccade system in accurately recognizing characters, with recognition error being reduced between 41–73% over that produced in the Saccade system.

Although we discussed system 5 as operating on a sequential basis, i.e. character "hearts" are located for all characters within a field before recognition begins of any of these characters, to expedite processing and provide heightened throughput, our inventive system could also be operated on a pipe-lined parallel basis. In this instance, after the "heart" of a current character was located, image windowing block 140 (see FIG. 1) would not merely wait for the next character "heart" to be located but instead could parse the image to send a 24×24 pixel field portion centered about the current character to character classifier 160 for immediate recognition. In this manner, a character could be recognized while the field pixel position of the next character "heart" was being determined. Thus, rather than incorporating a full field delay into the processing—which of course varies based upon the number of separate character "hearts" located in the field, between character "heart" detection and recognition, this delay could be readily decreased to a single character delay through pipelined parallel processing.

Furthermore, although we described postprocessing block 170 as utilizing a relatively simple rule-based two-level reject process to identify and reject erroneous characters, increasingly sophisticated rejection techniques could be used instead. For example, postprocessing block 170 could determine the variance associated with predicted adjacent character "heart" separations in a document or field and reject those character "hearts" that are statistically too close positionally as compared to other such character "hearts" in the same field or document. Furthermore, if two character "hearts" were found to be too close together, i.e. separated by six pixels or so, both character "hearts" may be associated with different portions of a large single wide character. For example, a left portion of wide zero may be recognized as a "1" while right portion may be recognized as a "7". In view of the small spacing between these two character "hearts", postprocessing block 170 could instruct image windowing block 140 to re-align the 24×24 pixel field portion to a field pixel position situated between both character portions and then route a resulting parsed pixel field portion to the classifier for re-classification in an attempt to recognize the correct character, i.e. the numeral zero. Re-alignment and re-classification would also be appropriate in those instances where character "hearts" are not only too close positionally but are determined with a relatively low statistical confidence level— thereby indicative of ambiguity between the character "hearts" detected and the actual character being recognized.

Furthermore, by now, those skilled in the art clearly recognize that although our invention has been described in terms of a system for recognizing handwritten characters, our inventive teachings can be nevertheless be applied to systems for visually recognizing nearly any pre-defined object with a scanned image produced from any of a wide variety of sources, other than just a scanned document, in order to improve the accuracy of the recognition.

Although one embodiment of the present invention has been shown and described in detail herein, many other varied embodiments that incorporate the teachings of the invention may be easily constructed by those skilled in the art.

INDUSTRIAL APPLICABILITY AND ADVANTAGES

The present invention is not only useful in optical character recognition (OCR) systems but generally in a wide variety of systems that performs pattern recognition. The invention quickly and reliably locates a desired object, such as a character, from within a field of objects, such as a string of characters, such that the desired object can be subsequently recognized. By properly locating the desired object, overall recognition accuracy advantageously increases.

We claim:

1. An optical character recognition system for recognizing a character situated within an image field, wherein the image field contains image pixels and said system detects a position of a pre-defined element of said character within the image field, said system comprising:

means for successively extracting pre-defined array portions from said field so as to define a plurality of corresponding windows, all of said windows having a pre-defined size, wherein each of the windows has a starting position relative to the field that is offset, along a horizontal field direction, by a pre-defined pixel amount with respect to the starting position of an adjacent one of the windows relative to the field;

a first neural network, responsive to said extracting means and having a plurality of first input nodes and a plurality of first output nodes, wherein each output node is associated with a different horizontal pixel location within an array portion of each window, and the first neural network:

generates an activation output at one of the first output nodes whenever the position of the pre-defined element, of the character and appearing in any of said windows, coincides with a horizontal pixel location associated with said one first output node forms, in response to all of the windows, a plurality of output activations for each of the first output nodes, and wherein arrays of the image pixels, each situated in a corresponding one of said windows, are each successively applied to corresponding ones of said plurality of first input nodes of said first neural network in order to generate said output activations, and means, responsive to plurality of activation outputs that occur for all of the windows, for ascertaining the position, with respect to the field, of the pre-defined element of the character wherein said ascertaining means has:

means for averaging over time the activation output generated by each of said first output nodes and produced for all of said windows to yield an average activation value for each of said first output nodes;

means for filtering the average activation value for each of the first output nodes to yield an index value for each of said first output nodes;

means for thresholding the index values, against a pre-defined threshold value, for said first nodes thereby yielding an activation group formed of thresholded index values; and means responsive to thresholded index values within the activation group, for determining the position of the pre-defined element of the character.

2. The system in claim 1 wherein the position of the pre-defined element is a center of the character and wherein the array portion is centrally located within each of said windows.

3. The system in claim 2 wherein said extracting means parses a portion of the field containing said character and as defined by the position of the pre-defined element so as to yield a parsed field portion, and comprises means for recognizing the one character in said parsed field portion and for providing an output representing said one character.

4. The system in claim 3 further comprising means, responsive to the image field containing the character, for defining a sub-image containing the character, for normalizing the sub-image to a pre-defined size and for applying the sub-image to the extracting means as the field.

5. The system in claim 3 wherein said recognizing means comprises a character classifier to which each of the pixels in said parsed field portion being routed as input and for providing the output representing the one character.

6. The system in claim 5 wherein said character classifier is a second neural network having a plurality of second input nodes and plurality of output nodes, each of the image pixels in the parsed field portion being routed to a different corresponding one of the second input nodes and each of the second output nodes represents a different one of a plurality of symbols in a character set.

7. The system in claim 6 wherein the second neural network comprises: an input layer, a plurality of hidden layers and an output layer.

8. The system in claim 7 wherein a first one of the hidden layers in said second neural network is a Gabor layer and each of the remaining hidden layers in the second neural network is a trainable layer.

9. The system in claim 5 wherein said recognizing means further comprises means, responsive to the position of the pre-defined element of the character and a confidence measure provided by the character classifier, for validating a character recognized by said character classifier as a valid character and for providing the valid character as the output representing said one character.

10. The system in claim 2 wherein the averaging means forms a weighted average of said activation outputs generated by each of said first output nodes, wherein each of said activation outputs is weighted by a corresponding one of a first set of weights, each of said first weights being a pre-defined number so as to favor activation outputs occurring in a central section of the array portion of each of said windows.

11. The system in claim 2 wherein said filtering means forms a weighted combination of predefined groups of averaged activation values for successive ones of the first output nodes to yield corresponding index values.

12. The system in claim 2 wherein said position determining means comprises means for providing the position of the pre-defined element of the character as a weighted average of said thresholded index values, wherein each of said thresholded index values is weighted by a corresponding one of a second set of weights, each of said second weights being a number representative of a pixel position associated with a corresponding one of said thresholded index values.

13. The system in claim 2 wherein the first neural network comprises: an input layer, a plurality of hidden layers and an output layer.

14. The system in claim 13 wherein a first one of the hidden layers in said first neural network is a Gabor layer and each of the remaining hidden layers in the first neural network is a trainable layer.

15. In an optical character recognition system for recognizing a character situated within an image field, wherein the image field contains image pixels and the system detects a position of a pre-defined element of said character with respect to the field, a method comprising the steps of:

successively extracting pre-defined array portions from said field so as no define a plurality of corresponding windows, all of said windows having a pre-defined size, wherein each of the windows has a starting position relative to the field that is offset, along a horizontal field direction, by a pre-defined pixel amount with respect to the starting position of an adjacent one of the windows relative to the field;

through a first neural network, responsive to said extracting step and having plurality of first input nodes and a plurality of first output nodes, wherein each output node is associated with a different horizontal pixel location within an array portion of each windows the steps of:

successively applying arrays of the image pixels, each array being situated in a corresponding one of said windows, to corresponding ones of first input nodes; and generating an activation output at one of the first output nodes whenever the position of the pre-defined element, of the character and appearing in any of said windows, coincides with a horizontal pixel location associated with said one first output node so as to form, in response to all of the windows, a plurality of output activations for each of the first output nodes; and ascertaining, in response to plurality of activation outputs that occur for all of the windows, the position, with respect to the field, of the pre-defined element of the character wherein said position ascertaining step further comprises the steps of:

averaging over time, the activation outputs generated by each of said first output nodes and produced for all of said windows to yield an average activation value for each of said first output nodes;

filtering the average activation value associated with each of the first output nodes to yield an index value for each of said first output nodes;

thresholding the index values, against a pre-defined threshold value, for said first nodes thereby yielding an activation group formed of thresholded index values; and determining, in response to thresholded index values within the activation group, the position of the pre-defined element of the character.

16. The method in claim 15 wherein the position of the pre-defined element is a center of the character and wherein the array portion is centrally located within each of said windows.

17. The method in claim 16 wherein said extracting step comprises the steps of:

parsing a portion of the field containing said character and as defined by the position of the pre-defined element so as to yield a parsed field portion;

recognizing the one character in said parsed field portion; and providing an output representing said one character.

18. The method in claim 17 further comprising the steps, in response to the image field containing the character, of:

defining a sub-image containing the character;

normalizing the sub-image to a pre-defined size; and applying the sub-image to the extracting step as the field.

19. The method in claim 17 wherein said recognizing step comprises the steps of:

classifying a character in said parsed field portion being routed as input; and providing a classification output as the output representing the one character.

20. The method in claim 19 wherein said recognizing step further comprises the steps of:

validating, in response to the position of the pre-defined element of the character and a confidence measure provided by the character classifying step, a character recognized by said character classifier as a valid character; and providing the valid character as the output representing said one character.

21. The method in claim 16 wherein the averaging step comprises the step of forming a weighted average of said activation outputs generated by each of said first output nodes, wherein each of said activation outputs is weighted by a corresponding one of a first set of weights, each of said first weights being a predefined number so as to favor activation outputs occurring in a central section of the array portion of each of said windows.

22. The method in claim 16 wherein said filtering step comprises the step of forming a weighted combination of pre-defined groups of averaged activation values for successive ones of the first output nodes to yield corresponding index values.

23. The method in claim 16 wherein said position determining step comprises the step of providing the position of the pre-defined element of the character as a weighted average of said thresholded index values, wherein each of said thresholded index values is weighted by a corresponding one of a second set of weights, each of said second weights being a number representative of a pixel position associated with a corresponding one of said thresholded index values.

* * * * *